(12) United States Patent
Wang et al.

(10) Patent No.: US 8,630,308 B2
(45) Date of Patent: Jan. 14, 2014

(54) METHODS AND APPARATUSES FOR DETECTING DEVIATIONS FROM LEGITIMATE OPERATION ON A WIRELESS NETWORK

(75) Inventors: Xiaodong Wang, New York, NY (US); Alberto Lopez Toledo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/796,499

(22) Filed: Apr. 26, 2007

(65) Prior Publication Data
US 2007/0280187 A1 Dec. 6, 2007

Related U.S. Application Data

(60) Provisional application No. 60/810,002, filed on May 31, 2006.

(51) Int. Cl.
*H04L 12/43* (2006.01)

(52) U.S. Cl.
USPC ........... 370/458; 370/459; 370/328; 370/445; 370/447

(58) Field of Classification Search
USPC ......... 370/458, 459, 461, 462, 445, 447, 448, 370/465, 466, 328, 338
See application file for complete search history.

(56) References Cited

U.S. PATENT DOCUMENTS

| | | | |
|---|---|---|---|
| 6,456,239 B1 * | 9/2002 | Werb et al. | 342/463 |
| 6,915,123 B1 * | 7/2005 | Daudelin et al. | 455/410 |
| 7,065,351 B2 | 6/2006 | Carter et al. | |
| 7,519,968 B2 | 4/2009 | Koyama et al. | |
| 2005/0185666 A1 | 8/2005 | Raya et al. | |
| 2006/0189322 A1 * | 8/2006 | Conte et al. | 455/453 |
| 2007/0066229 A1 | 3/2007 | Zhang et al. | |
| 2007/0230335 A1 | 10/2007 | Sang et al. | |
| 2008/0181252 A1 | 7/2008 | Rofougaran | |
| 2010/0069013 A1 | 3/2010 | Chaudhri et al. | |
| 2010/0135226 A1 | 6/2010 | Chandramouli et al. | |
| 2011/0022342 A1 | 1/2011 | Pandharipande et al. | |
| 2011/0191281 A1 | 8/2011 | Park et al. | |
| 2011/0223910 A1 | 9/2011 | Xin et al. | |

OTHER PUBLICATIONS

Cardoso, L.S., et al., "Cooperative Spectrum Sensing Using Random Matrix Theory", in 3rd International Symposium on Wireless Pervasive Computing (ISWPC), May 7-9, 2008, pp. 334-338.

(Continued)

*Primary Examiner* — Ajit Patel
(74) *Attorney, Agent, or Firm* — Byrne Poh LLP

(57) ABSTRACT

Methods and apparatuses for detecting deviations from legitimate operation on a wireless network. The method includes detecting a sequence of observable events related to operation of an entity in the wireless network, and determining from the detected sequence of observable events for a particular entity in the wireless network what number of idle slots occurred between two consecutive observable events to provide a first output. The method further includes obtaining a second output corresponding to the number of idle slots between two consecutive observable events for legitimate operation of any entity in the wireless network using the network transmission protocol, and comparing a function of the first output with a function of the second output to determine whether or not the particular entity is deviating from legitimate operation of the network transmission protocol.

24 Claims, 17 Drawing Sheets

(56) References Cited

OTHER PUBLICATIONS

Chaudhari, S., et al., "Distributed Autocorrelation-Based Sequential Detection of OFDM Signals in Cognitive Radios", 3rd International Conference on Cognitive Radio Oriented Wireless Networks and Communications, Singapore, May 15-17, 2008, pp. 1-6.

Chen, H.S., et al., "Signature Based Spectrum Sensing Algorithms for IEEE 802.22 WRAN", IEEE Conference on Communications (ICC), 2007, Jun. 24-28, 2007, pp. 6487-6492.

European Telecommunications Standards Institute, "Spatial Channel Model for Multiple Input Multiple Output (MIMO) Simulations, 3GPP TR 25.966 V8.0.0", Jan. 30, 2009, available at: http://www.etsi.org/deliver/etsi_tr/125900_125999/125996/08.00.00_60/tr_125996v080000p.pdf.

Farhang-Boroujeny, B., "Filter Bank Spectrum Sensing for Cognitive Radios", IEEE Transactions on Signal Processing, vol. 56, No. 5, May 2008, pp. 1801-1811.

Fasano, G. and Franceschini, A., "A Multidimensional Version of the Kolmogorov-Smirnov Test", Monthly Notices of the Royal Astronomical Society, vol. 225, Mar. 1, 1987, pp. 155-170.

Ghasemi, A. and Sousa, E., "Spectrum Sensing in Cognitive Radio Networks: Requirements, Challenges and Design Trade-Offs", IEEE Communications Magazine, vol. 46, No. 4, Apr. 2008, pp. 32-39.

Haykin, S., et al., "Spectrum Sensing for Cognitive Radio", Proceedings of the IEEE, vol. 97, No. 5, May 2009, pp. 849-877.

Hernandez, M.A.L., et al., "New Spectral Estimation Based on Filterbank for Spectrum Sensing", IEEE International Conference on Acoustics, Speech and Signal Processing (ICASSP 2008), Mar. 31-Apr. 4, 2008, Las Vegas, NV, USA, pp. 3509-3512.

International Patent Application No. PCT/US2011/064434, filed Dec. 12, 2011.

International Preliminary Report on Patentability in International Patent Application No. PCT/US2007/011895, filed May 18, 2007, mailed Dec. 3, 2008.

International Search Report in International Patent Application No. PCT/US2011/064434, filed Dec. 12, 2011, mailed Mar. 1, 2012.

Lai, L., et al., "Quickest Detection in Cognitive Radio: A Sequential Change Detection Framework", In Global Telecommunications Conference, (IEEE GLOBECOM 2008), New Orleans, LA USA, Nov. 30-Dec. 4, 2008, pp. 1-5.

Lopez Toledo, A. and Wang, X., "Robust Detection of Selfish Misbehavior in Wireless Networks", In IEEE Journal on Selected Areas in Communications, vol. 25, No. 6, Aug. 2007, pp. 1124-1134.

Ma, J., et al., "Signal Processing in Cognitive Radio", In Proceedings of the IEEE, vol. 97, No. 5, May 2009, pp. 805-823.

Middleton, D., "Non-Gaussian Noise Models in Signal Processing for Telecommunications: New Methods an Results for Class A and Class B Noise Models", IEEE Transactions on Information Theory, vol. 45, No. 4, May 1999, pp. 1129-1149.

Peacock, J., "Two-Dimensional Goodness-of-Fit Testing in Astronomy", Monthly Notices of the Royal Astronomical Society, vol. 202, Feb. 1983, pp. 615-627.

Penna, F., et al., "Cooperative Spectrum Sensing Based on the Limiting Eigenvalue Ratio Distribution in Wishart Matrices", IEEE Communications Letters, vol. 13, No. 7, Jul. 2009, pp. 507-509.

Sutton, P.D., et al., "Cyclostationary Signatures in Practical Cognitive Radio Applications", IEEE Journal on Selected Areas in Communications, vol. 26, No. 1, Jan. 2008, pp. 13-24.

U.S. Appl. No. 61/422,114, filed Dec. 10, 2010.

Vercauteren, T., et al., "Batch and Sequential Bayesian Estimators of the Number of Active Terminals in an IEEE 802.11 Network", In IEEE Transactions on Signal Processing, vol. 55, No. 2, Feb. 2007, pp. 437-450.

Yang, X., et al., "Trace Based Semi-blind and Blind Spectrum Sensing Schemes for Cognitive Radio", IEEE Conference on Communications (ICC), May 2010, pp. 1-5.

Yucek, T. and Arslan, H., "A Survey of Spectrum Sensing Algorithms for Cognitive Radio Application", IEEE Communications Surveys & Tutorials, vol. 11, No. 1, First Quarter 2009, pp. 116-130.

Zahabi, S.J. and Tadaion, A.A., "Local Spectrum Sensing in Non-Gaussian Noise", IEEE 17th International Conference on Telecommunications (ICT), Apr. 4-7, 2010, pp. 843-847.

Zeng, Y. and Liang, Y.C., "Eigenvalue-Based Spectrum Sensing Algorithms for Cognitive Radio", IEEE Transactions on Communications, vol. 57, No. 6, Jun. 2009, pp. 1784-1793.

Zhang, G., et al., "Fast and Robust Spectrum Sensing via Kolmogorov-Smirnov Test", IEEE Transactions on Communications, vol. 58, No. 12, Dec. 2010, pp. 3410-3416.

"Channel Model Implementations of WINNER", TKK.fi, Apr. 10, 2007, available at http://www.tkk.fi/Units/Radio/scm/.

"Section 13: Kolmogorov-Smirnov Test", MIT Lecture Notes, 2006, available at: http://ocw.mit.edu/NR/rdonlyres/Mathematics/18-443Fall-2006/DB432998-421E-4FE3-8B59-FA3859D4F445/0/lecture14.pdf.

Bianchi, G. and Tinnirello, I., "Kalman Filter Estimation of the Number of Competing Terminals in an IEEE 802.11 Network", In Proceedings of the 22nd Annual Joint Conference of the IEEE Computer and Communications Societies (INFOCOM '03), San Francisco, CA, USA, Mar. 30-Apr. 3, 2003.

Bianchi, G., "Performance Analysis of the IEEE 802.11 Distributed Coordination Function", In IEEE Journal on Selected Areas in Communications, vol. 18, No. 3, Mar. 2000, pp. 535-547.

Miskowicz, M., "The Event-Triggered Sampling Optimization Criterion for Distributed Networked Monitoring and Control Systems", In Proceedings of the IEEE International Conference on Industrial Technology (ICIT '03), vol. 2, Maribor, SI, Dec. 10-12, 2003, pp. 1083-1088.

Sahai, A. and Cabric, D., "Spectrum Sensing: Fundamental Limits and Practical Challenges", Presentation, in Proceedings of the First IEEE International Symposium on New Frontiers in Dynamic Spectrum Access Networks (DYSPAN '05), Baltimore, MD, USA, Nov. 8-11, 2005.

Sun, C., et al., "Cooperative Spectrum Sensing for Cognitive Radios under Bandwidth Constraints", In Proceedings of the IEEE Wireless Communications and Networking Conference (WCNC '07), Hong Kong, CN, Mar. 11-15, 2007, pp. 1-5.

Tsitsiklis, J.N., "Extremal Properties of Likelihood-Ratio Quantizers", In IEEE Transactions on Communications, vol. 41, No. 4, Apr. 1993, pp. 550-558.

U.S. Appl. No. 61/608,489, filed Mar. 8, 2012.

Wald, A. and Wolfowitz, J., "Optimum Character of the Sequential Probability Ratio Test", In Annals of Mathematical Statistics, vol. 19, No. 3, 1948, pp. 326-339.

Written Opinion in International Patent Application No. PCT/US2011/064434, filed Dec. 12, 2011, mailed Mar. 1, 2012.

Buttyan, L. et al., "Report on a working session on security in wireless ad hoc networks", Mobile Computing and Communications Review, 2002, vol. 6, No. 4, pp. 1-17.

Kyasanur, P. et al., "Selfish MAC layer misbehavior in wireless networks", 2005, pp. 502-516, vol. 4, No. 5.

Cagalj, M. et al., "On cheating in CSMA/CA ad hoc networks", EPFL-IC Technical Report No. IC/2004/27, Mar. 2004, pp. 1-16.

MacKenzie, A. et al., "Game theory and the design of self-configuring, adaptive wireless networks", IEEE Commun. Mag., 2001, pp. 126-131, vol. 39, No. 11.

MacKenzie, A. et al., "Stability of multipacket slotted aloha with selfish users and perfect information", In Proceedings of IEEE Infocom' 03, 2003, pp. 1583-1590.

Raya, M. et al., "DOMINO: A system to detect greedy behavior in IEEE 802.11 hotspots", In Proceedings of MobySys'04, Jun. 2004, pp. 1-18.

Radosavac, S. et al., "A famework for MAC protocol misbehavior detecton in wireless networks", in WiSe'05: Proceedings of the 4th ACM workshop on Wireless security, 2005, pp. 33-42.

Cardenas, A. et al., "Detection and prevention of MAC layer misbehavior in ad hoc networks", in SASN'04, Proceedings of the 2nd ACM workshop on Security of ad hoc and sensor networks, 2004, pp. 17-22.

Buchegger, S. et al., "Performance analysis of the CONFIDANT protocol", in Proceedings of MobiHoc'02, Jun. 2002, pp. 226-236.

Buchegger, S. et al., "Nodes bearing grudges: Towards routing security, fairness, and robustness in mobile ad hoc networks", In Proceed-

(56) References Cited

OTHER PUBLICATIONS ings of 10th Euromicro Workshop Parallel, Distributed and Network-Based Processing, Jan. 2002; pp. 403-410.

Lopez Toledo, A. et al., "Adaptive optimization of IEEE 802.11 DCF based on bayesian estimation of the number of competing terminals", IEEE Trans. on Mobile Computing, Sep. 2006, vol. 5, No. 9, pp. 1-14.

Wang, C. et al., "A new collision resolution mechanism to enhance the performance of IEEE 802.11 DCF", IEEE Trans. Veh. Technol., 2004, pp. 1235-1246, vol. 53, No. 4.

Lopez Toledo, A. et al., "Optimizing IEEE 802.11 DCF using bayesian estimators of the network state", In Proceedings of IEEE International Conference Acous., Speech, Sig. Proc. (ICASSP'05), Mar. 2005, pp. 933-936, vol. 5, Philadelphia, PA.

Massey, F. et al., "The kolmogorov-smirnov test for goodness of fit", Journal of the American Statistical Association, 1951, pp. 68-78, vol. 46, No. 253.

Khamis, H., "The delta-corrected kolmogorov-smirnov test for goodness of fit", Journal of Statistical Planning and Inference, 1990, pp. 317-335, vol. 24.

Khamis, H., "The two-stage delta-corrected kolmogorov-smirnov test", Journal of Applied Statistics, 2000, pp. 439-450, vol. 27, No. 4.

Medepalli, K. et al., "Voice capacity of IEEE 802.11b, 802.11a and 802.11g wireless LANs", In Proceedings of Globecom 2004, 2004, pp. 1549-1553.

Ask, J. et al., "US Home Wireless Network Forecast, 2005 to 2010", Sep. 28, 2005, Jupiter Research, pp. 1-5.

Ask, J. et al., "Home Wi-Fi: Consumer Security Fears Help Drive Adoption of New Devices", Feb. 25, 2005, Jupiter Research, pp. 1-4.

Sebastian, I. et al., "Home Wi-Fi Security: Understanding Consumer Behavior and Impact on Wi-Fi Adoption", Jun. 22, 2006, Jupiter Research, pp. 1-5.

Ask, J. et al., "Home Wireless Network Forecast", Oct. 29, 2004, Jupiter Research, pp. 1-4.

Ask, J. et al., "Public Wi-Fi: Capturing Paying Customers in an Increasingly Competitive Space", vol. 3, Mar. 23, 2006, Jupiter Research, pp. 1-22.

International Search Report and Written Opinion in PCT Application No. PCT/US07/11895, filed May 18, 2007.

International Patent Application No. PCT/US2013/030011, filed Mar. 8, 2013.

International Preliminary Report on Patentability dated Jun. 20, 2013 in International Patent Application No. PCT/US2011/064434.

International Search Report dated May 20, 2013 in International Patent Application No. PCT/US2013/030011, filed Mar. 8, 2013.

Nguyen-Thanh, N., "Log-Likelihood Radio Optimal Quantizer for Cooperative Spectrum Sensing in Cognitive Radio", In IEEE Communications Letters, vol. 15, No. 3, Mar. 2011, pp. 317-319.

Written Opinion in International Patent Application No. PCT/US2013/030011, filed Mar. 8, 2013, mailed May 20, 2013.

\* cited by examiner

METHODS AND APPARATUSES FOR DETECTING DEVIATIONS FROM LEGITIMATE OPERATION ON A WIRELESS NETWORK

CROSS REFERENCE TO RELATED CASES

This application claims priority to, and the benefit of, Provisional U.S. Patent Application Ser. No. 60/810,002 filed May 31, 2006, the entirety of which is incorporated herein by reference.

STATEMENT REGARDING FEDERALLY SPONSORED RESEARCH OR DEVELOPMENT

This invention was made with government support under CCR-0207550 awarded by the National Science Foundation and N00014-03-1-0039 awarded by the Office of Naval Research. The government has certain rights in the invention.

FIELD

The disclosed subject matter relates to methods and apparatuses for detecting deviations from legitimate operation on a wireless network. For example, the disclosed methods and apparatuses can detect an entity in a wireless network that deviates from legitimate operation of a network transmission protocol used on the wireless network.

BACKGROUND

The carrier-sense multiple-access with collision avoidance (CSMA/CA) protocol relies on the random deferment of packet transmissions for contention resolution and efficient use of the communication channel that is shared among many terminals (i.e., nodes) in a network. This contention resolution typically is based on cooperative protocols, such as IEEE 802.11 distributed coordination function (DCF), which is a popular protocol for wireless networks.

The operation of the DCF protocol is based on time multiplexing access of the terminals to the network, and it is assumed that all the terminals in the network will obey the protocol guidelines. However, the pervasive nature of wireless networks together with the requirement for flexible and readily reconfigurable protocols has resulted in wireless network devices becoming easily programmable. Wireless interface software, such as MadWifi for the Atheros chipsets (http://madwifi.org/) or the ipw series for the Intel PRO/Wireless chipsets (e.g. http://ipw2100.sourceforge.net/), can be easily modified and the protocol parameters can be changed by users so that one particular network terminal is capable of deviating from legitimate operation of a network transmission protocol in order to gain an advantage over other network terminals (i.e., referred to as selfish misbehavior), or to disrupt the network operation (i.e., referred to as malicious misbehavior).

Therefore, it is necessary to have a mechanism to detect when a network terminal is deviating from legitimate operation under the protocol rules. Unfortunately, detecting such deviation is difficult due to the random operation of the CSMA/CA protocol and the nature of the wireless medium itself, where network channel impairment and interference make network conditions appear different for different terminals.

Deviation from legitimate protocol operation in wireless networks has received considerable attention. Most of the current research focuses on malicious misbehavior, in which terminals do not obey the protocols with the sole objective of disrupting the operation of the network, even to the deviating terminal's own determent. Malicious misbehaviors of this kind are often referred to as denial-of-service (DoS) attacks.

While malicious misbehavior is abundant, it is usually limited to a small percentage of users. Selfish misbehavior, on the other hand, is employed by users who wish to increase their own share of the common network transmission resources.

Selfish misbehaviors on network terminals are often analyzed in the framework of game theory, as such terminals compete to maximize their own utilities, such as allowed bandwidth, for example. An example of selfish misbehavior involves a network terminal refusing to forward data packets on behalf of other hosts to conserve energy. Another example of selfish misbehavior involves a user knowingly modifying protocol parameters to allow a network terminal to obtain unfair access to a network communication channel, such as a greater data transmission bandwidth, for example.

Selfish misbehavior has been studied in various scenarios in different communication layers and under several mathematical frameworks. Most notably, a heuristic set of conditions has been proposed for testing the extent to which Medium Access Control (MAC) protocol parameters have been manipulated. The heuristic nature of this method limits its application to specific protocols and the technique can be compromised by any terminal that knows those conditions.

A modification to the IEEE 802.11 MAC protocol has been proposed to detect selfish misbehavior. This approach assumes a trustworthy receiver, which assigns to a sender a back-off value to be used. Relying on the receiver and modifying the IEEE 802.11 protocol are drawbacks to this approach. In another approach, a detection framework has been employed to analyze the instance of theoretical worst-case attacks. This approach is more robust. However, no operational method to detect misbehavior is offered.

The prompt detection of misbehaving network terminals is a significant security issue. It has been shown that an IEEE 802.11 DCF can be designed with complete stability (i.e., free of misbehavior) if a way to detect terminals that deviate from the IEEE 802.11 protocol can be found. See Toledo, Alberto Lopez, et al., "Adaptive Optimization of IEEE 802.11 DCF Based on Bayesian Estimation of the Number of Competing Terminals," IEEE Transactions in Mobile Computing, Volume 5, No. 9, pp 1283-1296, September 2006.

SUMMARY

Methods and apparatuses are disclosed for detecting deviations from legitimate operation on a wireless network. For example, the disclosed methods and apparatuses can detect an entity in a wireless network that deviates from legitimate operation of a network transmission protocol used on the wireless network.

One aspect is directed to a method for detecting an entity in a wireless network that deviates from legitimate operation of a network transmission protocol used on the wireless network, comprising: detecting a sequence of observable events related to operation of an entity in the wireless network; determining from the detected sequence of observable events for a particular entity in the wireless network what number of idle slots occurred between two consecutive observable events, to provide a first output; obtaining a second output corresponding to the number of idle slots between two consecutive observable events for legitimate operation of any entity in the wireless network using the network transmission protocol; and comparing a function of the first output with a function of the second output to determine whether the particular entity is deviating from legitimate operation of the network transmission protocol.

Another aspect is directed to an apparatus for detecting an entity in a wireless network that deviates from legitimate operation of a network transmission protocol used on the wireless network, comprising: means for detecting a sequence of observable events related to operation of an entity in the wireless network; means for determining from the detected sequence of observable events for a particular entity in the wireless network what number of idle slots occurred between two consecutive observable events, to provide a first output; means for obtaining a second output corresponding to the number of idle slots between two consecutive observable events for legitimate operation of any entity in the wireless network using the network transmission protocol; and means for comparing a function of the first output with a function of the second output to determine whether the particular entity is deviating from legitimate operation of the network transmission protocol.

Another aspect is directed to an apparatus for detecting an entity in a wireless network that deviates from legitimate operation of a network transmission protocol used on the wireless network, comprising: a detector coupled to the wireless network and configured to detect a sequence of observable events related to operation of an entity in the wireless network; a first calculation module configured for determining from the detected sequence of observable events for a particular entity in the wireless network what number of idle slots occurred between two consecutive observable events, to provide a first output; a second calculation module configured for obtaining a second output corresponding to the number of idle slots between two consecutive observable events for legitimate operation of any entity in the wireless network using the network transmission protocol; and a comparator configured for comparing a function of the first output with a function of the second output to determine whether or not the particular entity is deviating from legitimate operation of the network transmission protocol.

Another aspect is directed to an apparatus for detecting an entity in a wireless network that deviates from legitimate operation of a network transmission protocol used on the wireless network, the apparatus comprising: a data input module configured to communicate with a router and receive data related to transmissions of terminals; and a digital data processing device. The digital data processing device is configured to: receive the data from the input module; detect a sequence of observable events related to operation of an entity in the wireless network; determine from the detected sequence of observable events for a particular entity in the wireless network what number of idle slots occurred between two consecutive observable events, to provide a first output; obtain a second output corresponding to the number of idle slots between two consecutive observable events for legitimate operation of any entity in the wireless network using the network transmission protocol; and compare a function of the first output with a function of the second output to determine whether or not the particular entity is deviating from legitimate operation of the network transmission protocol.

DETAILED DESCRIPTION

Figure 1A:
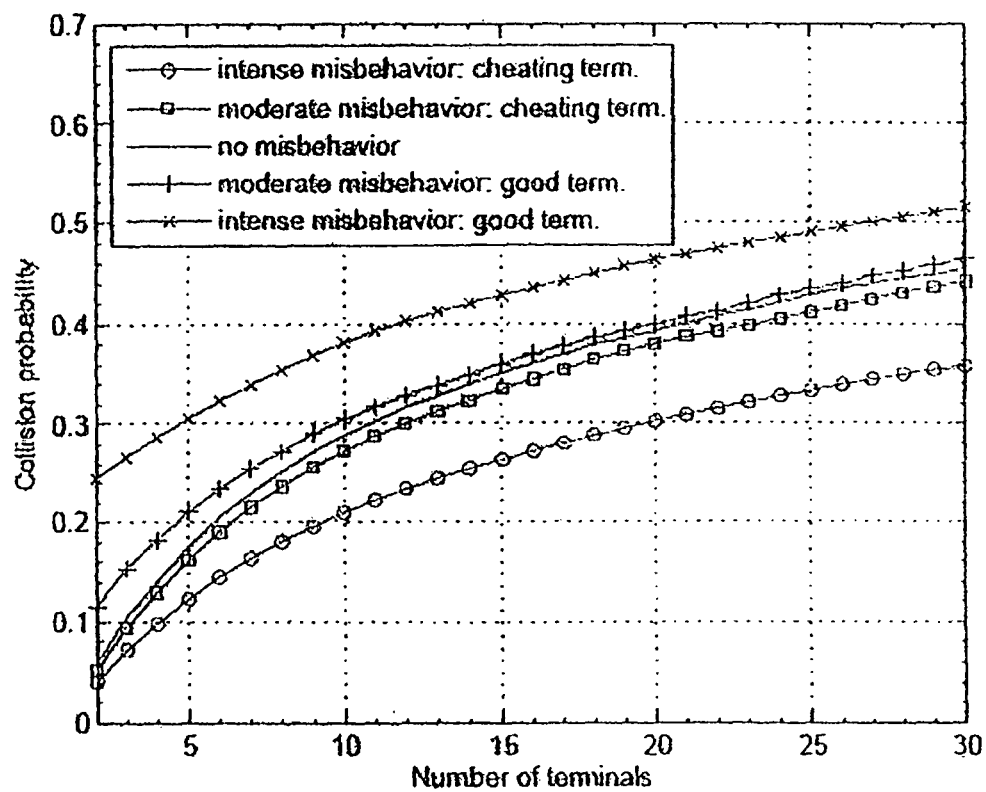
FIG. 1A is an illustrative graph of observed collision probabilities with one misbehaving terminal in an IEEE 802.11 DCF network.

The disclosed subject matter provides, among other things, a method and apparatus for detecting an entity (e.g., a network terminal) in a wireless network that deviates from legitimate operation of a network transmission protocol (i.e., a misbehaving terminal) on the wireless network.

In some embodiments, the system and method are used to detect misbehaving terminals in a CSMA/CA network by measuring/observing the number of idle slots between successful transmissions of terminals in communication with the network. The Kolmogorov-Smirnov (K-S) test is employed to determine whether the measurements/observations are consistent with a hypothesis that a particular terminal is abiding by the CSMA/CA protocol rules. Two misbehaving terminal detection algorithms are described. Specifically, a batch K-S detection algorithm and a N-truncated sequential K-S detection algorithm are described and used to detect misbehaving terminals in an IEEE 802.11 DCF network.

The CSMA/CA protocol is designed under the assumption that all participant terminals (i.e., nodes) abide by the protocol rules. This is of particular importance in distributed protocols such as the IEEE 802.11 DCF, in which network terminals (i.e., network nodes) control their own back-off window. The disclosed subject matter provides a method and system to detect network terminals that have had their back-off windows deliberately modified to obtain unfair access to network resources, such as data transmission bandwidth, for example. The method and system involves non-parametric batch and N-truncated sequential detection algorithms based on the Kolmogorov-Smirnov (K-S) statistics that do not require any modification of the existing CSMA/CA protocol. Further, in one embodiment, the method and system is implemented to detect network terminals that deviate from legitimate operation in an IEEE 802.11 DCF network.

The CSMA protocol is a contention-based MAC protocol in which a transmitting terminal detects and scans the shared wireless medium before transmitting. The rationale behind this transmission protocol is to avoid more than one terminal transmitting data at the same time, hence avoiding data collisions. If a channel is determined to be busy or a collision occurs, the terminal waits for a randomly chosen period of time (i.e. back-off interval). The back-off interval is the number of contention slots the terminal waits before re-transmitting. This randomly chosen period of time is selected from a range of times (i.e., range of numbers of contention slots (the back-off window)), The terminal then checks again to see if the communication channel is clear. Collision avoidance (CA) is used to improve the performance of CSMA by attempting to reserve the network for a single transmitter. This is important for systems in which collisions are very costly, such as in wireless networks, where they cannot be detected by the terminals producing them.

The IEEE 802.11 DCF protocol is a CSMA/CA protocol that defines two distinct techniques to access the wireless medium. The two techniques include basic access and request to send/clear to send (RTS/CTS) access. In basic access, network terminals implement a two-way handshake mechanism. A terminal scans a communication channel and detects if the channel is idle before starting a transmission. If the channel is idle for at least a period of distributed interframe space (DIFS), then the terminal is allowed to transmit. If during this detecting time the channel appears to be busy at any time, the terminal defers the transmission and enters into the collision avoidance (CA) mode. In CA mode the terminal generates a random back-off interval during which it waits before attempting another transmission. This random back-off interval is used to minimize the probability of collision between terminals accessing the wireless medium. The idle time after waiting a DIFS interval is slotted, and the terminals are only allowed to transmit at the beginning of the slot.

The random back-off interval is uniformly chosen between [0, v] (in the sense that a uniform probability distribution is used to randomly pick a value between 0 and v with equal probability), where v is called the contention window, and satisfies the function: $v^* \epsilon [CW_{min}, CW_{max}]$, where $CW_{min}$ and $CW_{max}$ are called the minimum and maximum contention windows respectively. Typically, $CW_{min}=32$ and $CW_{max}=1024$. At the first transmission attempt, v is set to $CW_{min}$. The back-off timer is decremented while the channel is idle (i.e., the timer only counts the idle time). If at any time the terminal detects that the channel is busy, the back-off timer is paused until the terminal detects that the channel is idle again after the corresponding DIFS time. When the back-off timer reaches 0, the terminal is allowed to transmit.

Following the successful reception of the data, the receiving terminal waits for a short interframe space (SIFS) interval and transmits an acknowledge signal (ACK) to the transmitting terminal. As the SIFS interval is shorter than the DIFS interval, the destination terminal has priority in sending the ACK. The other terminals would wait for a DIFS time before transmitting, and hence will find the medium busy while they wait. Such a two-way handshake-based ACK is necessary because the CSMA/CA protocol does not assume that the terminals have the capability to detect collisions. Upon reception of the ACK, the back-off timer is reset to 0 and $v=CW_{min}$.

If the transmitting terminal does not receive the ACK signal after a timeout period (i.e., ACK timeout) or it detects the transmission of any other frame in the channel (i.e., a collision), the frame is assumed to be lost. After each unsuccessful transmission, the value of v is doubled up to a maximum of $CW_{max}=2^m CW_{min}$ where m is typically referred to as the maximum back-off stage. This mode of operation is typically referred to as a binary exponential scheme. The values of $CW_{min}$, $CW_{max}$, and the slot size (i.e. duration of the slot) are determined by the characteristics of the physical layer of the network.

RTS/CTS access is similar to basic access. However, it makes use of a four-way handshake protocol in which, prior to data transmission, a terminal transmits a special short request-to-send frame (RTS) to try to reserve the transmission window and reduce the cost of collisions.

Given its distributed nature, the operation of the IEEE 802.11 DCF protocol is based on the premise that individual terminals correctly assign their respective back-off intervals according to the protocol. In the absence of a central controlling unit enforcing this policy, a terminal that deviates from legitimate operation (i.e., a "deviating" or "misbehaving" terminal) might try to select back-off intervals that are smaller than allowed by the protocol to gain a significant advantage in channel access probability over time. By increasing their transmission probabilities, misbehaving terminals produce an increase in the number of collisions in the network, forcing the rest of the legitimate terminals (i.e., terminals that abide by the protocol, or "non-misbehaving" terminals) to increment their back-off intervals, further increasing the advantage for the misbehaving terminals.

Typical techniques implemented to create a misbehaving terminal include: reducing the terminal's contention window, selecting a smaller minimum window size for the terminal, or using a different scheme instead of the binary exponential scheme (i.e., waiting for a fixed amount of time).

Figure 1B:
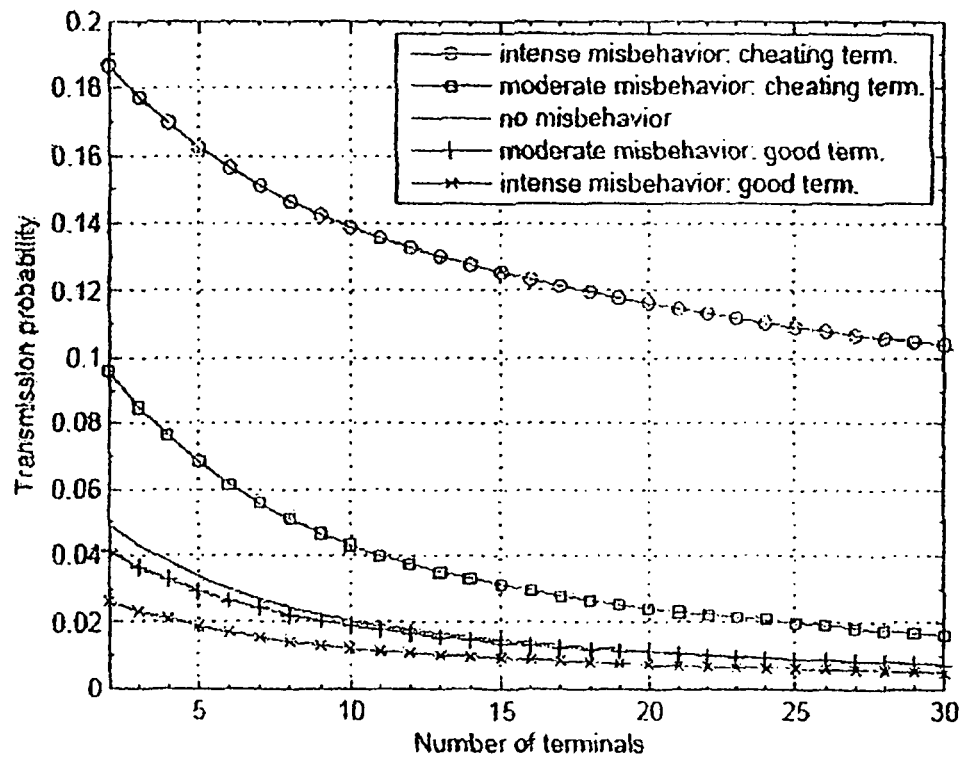
FIG. 1B is an illustrative graph of observed transmission probabilities with one misbehaving terminal in an IEEE 802.11 DCF network, according to one embodiment of the disclosed subject matter.

Referring to FIGS. 1A and 1B, illustrative graphs of observed collision probabilities and observed transmission probabilities with one misbehaving terminal in an IEEE 802.11 DCF network are shown. Each point is calculated by a terminal listening to all the transmissions in the network and calculating the proportion that resulted in a collision. Any terminal can observe any transmission and determine if it is successful or if it is a collision, and this is a capability inherent in any wireless card. For FIG. 1A, the graph shows the calculation result of number-of-collisions/number-of-total-transmissions. For FIG. 1B, the graph shows the calculation result of number-of-successful-transmissions/time.

The effect of a misbehaving terminal can be significant to the operation of the DCF protocol, especially for the legitimate terminals. The one misbehaving terminal uses either a fixed back-off window with $CW_{min}=CW_{max}=8$ (i.e., an intense misbehavior), or uses the binary exponential protocol with $CW_{min}=16$ and $CW_{max}=1024$ (i.e., a moderate misbehavior). It can be seen that the misbehaving terminal will observe a much reduced collision probability, which results in a share of the medium (i.e. transmission probability) that can be even higher than five times that of the legitimate terminals. The difference is notable even for more moderate misbehaviors, hence there is a strong incentive for a terminal to misbehave, as the potential benefit in terms of increased throughput is high even for a small deviation from the DCF protocol.

It is important to note that a misbehaving terminal is completely unpredictable. This uncertainty makes detecting misbehaving terminals difficult. The method and system described in the subject matter disclosed below involves detecting when a terminal is misbehaving by observing the operation of the misbehaving terminal in the network.

Let $\chi_1, \ldots, \chi_n$ be a sequence of observations related to the operation of a CSMA/CA terminal. There are two hypotheses that are made. They include a null hypothesis $H_0$ and an alternate hypothesis $H_1$. The null hypothesis $H_0$ corresponds to a situation when the observed terminal is not misbehaving (i.e., a legitimate terminal). The alternate hypothesis $H_1$ corresponds to a situation when the observed terminal is misbehaving. The null hypothesis $H_0$ is selected to the hypothesis of the terminals not misbehaving (and hence it is favored relative to $H_1$) because the cost of a false alarm (i.e., incorrectly determining that a terminal is misbehaving) is high (e.g., disconnecting a legitimate terminal from the network). It is important to guarantee that the legitimate terminals are not incorrectly determined to be misbehaving and thereby potentially leading to their being disconnected from the network. The problem is written as:

$$H_0: \chi_1, \ldots, \chi_n; f_0 \qquad \text{(Eq. 1a)},$$

$$H_1: \chi_1, \ldots, \chi_n; f_1 \qquad \text{(Eq. 1b)},$$

where $f_0$ and $f_1$ are the respective probability distributions of the observations when a terminal is not misbehaving and when it is misbehaving. These probability distributions are referred to as the "strategy" of a terminal.

The IEEE 802.11 DCF protocol defines the method to select the back-off intervals. It is useful to know the sequence of back-off intervals selected by a given terminal. In particular, it is useful to know how many idle slots the terminal waited since its last transmission before attempting a new transmission, so that it can be determined if that sequence corresponds to a binary exponential increase with the correct $CW_{min}$ and $CW_{max}$ parameters. However, the sequence of back-off intervals selected by a terminal is not directly observable in a CSMA/CA system, and in particular in an IEEE 802.11 DCF system, because the only observable transmissions from a terminal are successful transmissions. Attempted transmissions that result in collisions can be observed, but it is not possible to distinguish which terminals are involved in the collisions. Therefore, the observable events are the specific times at which a given terminal transmits.

Because the terminals only decrement their back-off counters when the channel is idle, the number of idle slots between two consecutive successful transmissions of a certain terminal is calculated. The procedure described with respect to Eq. 1a and Eq. 1b is used to obtain the number of idle slots in the network.

For example, consider the RTS/CTS access in a IEEE 802.11 DCF network. Let $t_{i-1}$ be the end time of the last transmission of any terminal and let $t_i$ be the time of a current RTS packet reception. It is assumed that these events are observable from all the terminals within range of the wireless transmissions (i.e. two terminals are within range of each other if they can detect each other's transmissions). The number of idle slots between those events can be calculated as follows:

$$\chi_i = (t_i - t_{i-1} - T_{DIFS} - T_{OTHERS})/\sigma, \; i>1 \qquad \text{(Eq. 2)},$$

where $T_{DIFS}$ is the duration of the DIFS frame, $\sigma$ is the duration of an idle slot, and $T_{OTHERS}$ is the duration of transmissions from other terminals and collisions, including their interframe times. More detail regarding $T_{OTHERS}$ is available, for example, in the above-mentioned Toledo et al. article relating to FIG. 1 thereof.

A terminal that is not directly within range of the terminal that transmits the RTS frame can also compute the back-off interval by using as a reference the time of reception of the overheard ACK from the receiver of the previous data segment as follows:

$$X_i = (t'_i - T_{ACK,i-1} - T_{DIFS} - T_{RTS} - T_{SIFS} - T_{OTHERS})/\sigma, \; i>1 \qquad \text{(Eq. 3)},$$

where $t'_i$ is the time of reception of the CTS packet, $T_{ACK,i-1}$ is the duration of the previous ACK frame, and $T_{DIFS}$, $T_{SIFS}$, and $T_{RTS}$ are the durations of a DIFS and SIFS periods, and the RTS frame respectively. The number of idle slots for the case of basic access can be obtained similarly.

To calculate the distribution of the observations $X_i$ under $H_0$, a typical IEEE 802.11 DCF network, where $CW_{min}=32$ and $CW_{max}=1024$, is considered. The distribution $f_0$ of the number of idle slots a terminal would wait between successful transmissions is derived as described below. Although the possible back-off values are discrete, for simplicity, continuous distributions are used to facilitate mathematical treatment. Assume that the legitimate terminal is saturating (i.e., it always has a packet to send), and let $p_c$ be the probability that the terminal will experience a collision if it transmits in the current slot. After a successful transmission by a terminal, the next attempt to transmit will happen after $\tau_1$ idle slots where $\tau_1 \sim U[0, 32]$ and $U$ denotes the uniform probability distribution. The probability that a transmission will be successful is $(1-p_c)$, and hence $X_i = \tau_1$.

If there is a collision, with probability $p_c$, then the terminal would double its window size and make another attempt after $\tau_2 \sim U[0, 64]$ slots. If the last transmission is successful, then the number of idle slots after the last successful transmission is $X_i = (\tau_1 + \tau_2) \sim (U[0, 32] + U[0, 64])$ with probability $p_c(1-p_c)$. Following the above argument the distribution of the number of idle slots between successful transmissions, $f_0(X_i)$ can be obtained according to the following equation (assuming $p_c$ does not vary between successful transmissions):

$$f_0(\chi_i) = \begin{cases} U[0, 32] & 1 - p_c \\ U[0, 32] + U[0, 64] & p_c(1 - p_c) \\ U[0, 32] + U[0, 64] + U[0, 128] & p_c^2(1 - p_c) \\ U[0, 32] + U[0, 64] + U[0, 128] + U[0, 256] & p_c^3(1 - p_c) \\ U[0, 32] + U[0, 64] + U[0, 128] + U[0, 256] + U[0, 512] & p_c^4(1 - p_c) \\ U[0, 32] + U[0, 64] + U[0, 128] + U[0, 256] + U[0, 512] + \sum_{i=5}^{n_r}[U, 1024] & p_c^n(1 - p_{c'}) \end{cases}, \quad \text{(Eq. 4)}$$

where $n_c < I_{max}$ is the number of collisions that the transmission undergoes and $I_{max}$ is the maximum allowable number of collisions.

Figure 2:
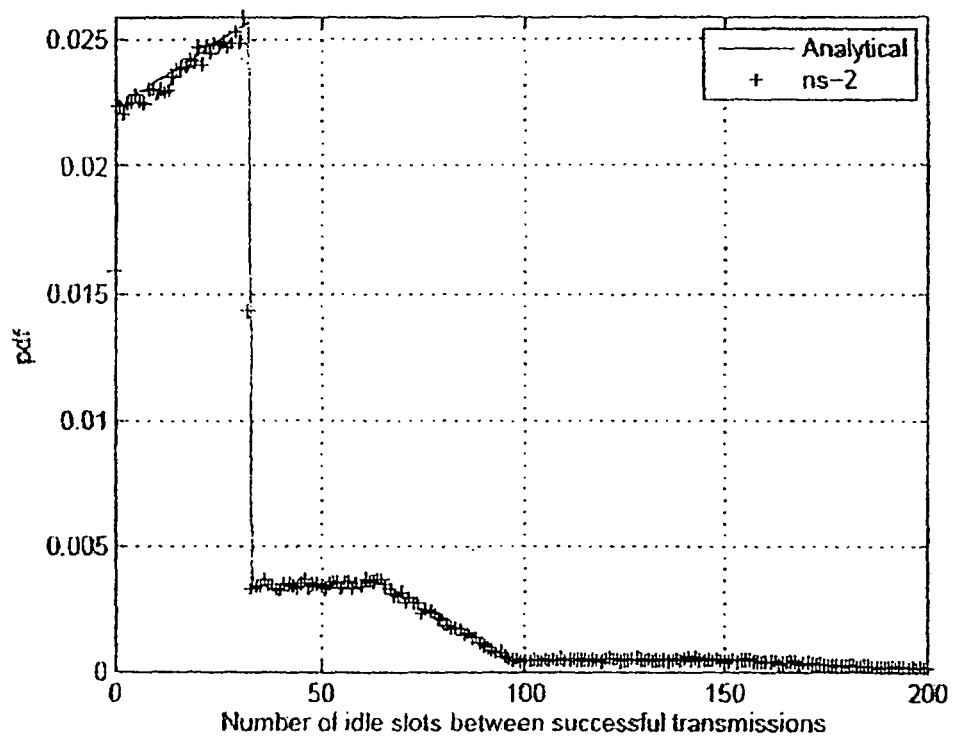
FIG. 2 is an illustrative graph of a probability density function and a histogram of the number of idle slots between successful transmissions in an IEEE 802.11 DCF network with ten saturating terminals.

Referring to FIG. 2, in one embodiment, a graph of the probability density function (pdf) (see Eq. 4) and the histogram of the number of idle slots between successful transmissions in an IEEE 802.11 DCF network with ten saturating terminals is shown.

The pdf $f_0$ calculated above is referred to as the "strategy" of a saturating legitimate terminal. In other words, it is a terminal that follows the IEEE 802.11 DCF protocol and always has a packet to send. The calculation of $f_0$ utilizes an estimation of the collision probability $p_c$ for the legitimate terminals, which is discussed in detail below.

Unlike the strategy of a legitimate terminal, the unknown strategy of a (potentially) misbehaving terminal is not unique. Assume $f_1$ is the unknown strategy of the observed potentially misbehaving terminal. In order to characterize and quantify the misbehavior, the strategy $f_1$ is compared to the strategy $f_0$ of the legitimate terminal. $F_1(X)$ and $F_0(X)$ denote the cumulative distribution functions (cdf) for $f_1$ and $f_0$, respectively. For a terminal that abides by transmission protocol rules and is saturating, the relationship $F_1(X)=F_0(X)$ applies. If the terminal is not saturating (e.g., the terminal rests for an unknown time $\Delta>0$ after each transmission or after some transmissions), then the terminal's cdf satisfies the expression: $F_1(X)<F_0(X), \forall \chi$. In general, for any terminal using the correct protocol, either saturating or not, then $\forall X, F_1(X) \leq F_0(X)$. If the cdf of a terminal is always on or below the cdf of a well-behaved terminal that is always transmitting, then the terminal is not misbehaving.

Therefore, a terminal using an unknown strategy $f_1$ with cdf $F_1$ is misbehaving, if $\exists X$, s.t. $F_1(X)>F_0(X)$, where $F_0$ is the cdf of the strategy of a legitimate terminal that is saturating. It should be noted that the definition of misbehavior does not take into account the transmission probability (and hence, the throughput) of the terminals. It is common to find a terminal for which there exists one point $\alpha$ such that $F_1(\alpha)>F_0(\alpha)$, where $\forall X \neq \alpha F_1(X) \leq F_0(X)$, and that has a transmission probability lower than that of the legitimate saturating terminal, and therefore appears non-misbehaving. However, the CSMA/CA protocol is designed so that the transmissions of a terminal are distributed as uniformly as possible in time to avoid collisions. Fairness is achieved as long as every terminal uses the same strategy. A terminal transmitting less than a legitimate terminal but using a different strategy may produce a disruption in the service during its transmission attempts, perturbing the normal operation of the protocol. Those terminals should be considered as misbehaving terminals.

The following is a discussion regarding a detection algorithm that can discriminate between a legitimate terminal using a strategy $f_0$ and a misbehaving terminal that does not. A non-parametric test based on the Kolmogorov-Smirnov statistic is used to perform the detection.

In order to obtain the probability distribution function $f_0$ of the idle slots between successful transmissions for a saturating legitimate terminal, the probability of collision $p_c$ in the network is estimated. A terminal can keep track of its own transmissions and count how many of its transmissions resulted in collisions. An estimate of the collision probability is given by the following equation:

$$\hat{p}_c = \frac{C}{T}, \quad \text{(Eq. 5)}$$

where T is the number of transmission attempts and C is the number of transmission attempts resulting in collisions. The terminal may increase or decrease the observation interval by changing the number of transmission attempts T to estimate the varying collision probability $p_c$ more accurately.

The above approach requires the measuring/observing terminal to transmit in order to count the number of transmission attempts that result in a collision, which makes this approach unsuitable for terminals that do not have anything to transmit. Moreover, if a misbehaving terminal is present in the network, the transmission rate of a legitimate terminal could be much lower than that of the misbehaving terminal, so the above estimator could be too slow compared to the transmission rate of a misbehaving terminal.

A faster estimate can be obtained if a terminal does not count how many of its own transmissions resulted in collisions, but instead how many of the total number of transmissions in the network resulted in collisions. While it is not possible to observe how many terminals attempted a transmission for any given collision because the identity and the number of the colliding terminals is hindered by the collision itself, the average number of terminals colliding (i.e., collision factor) $\Gamma$ is a function of the protocol and the number of terminals competing in the network. The collision factor $\Gamma$ is obtained counting the number of terminals involved for each collision, and then taking an average over the number of collisions. Thus, for n collisions, $$\Gamma = \frac{x_1 + x_2 + \ldots + x_n}{n},$$

where $x_i$ is the number of terminals involved in the i-th collision.

Figure 3:
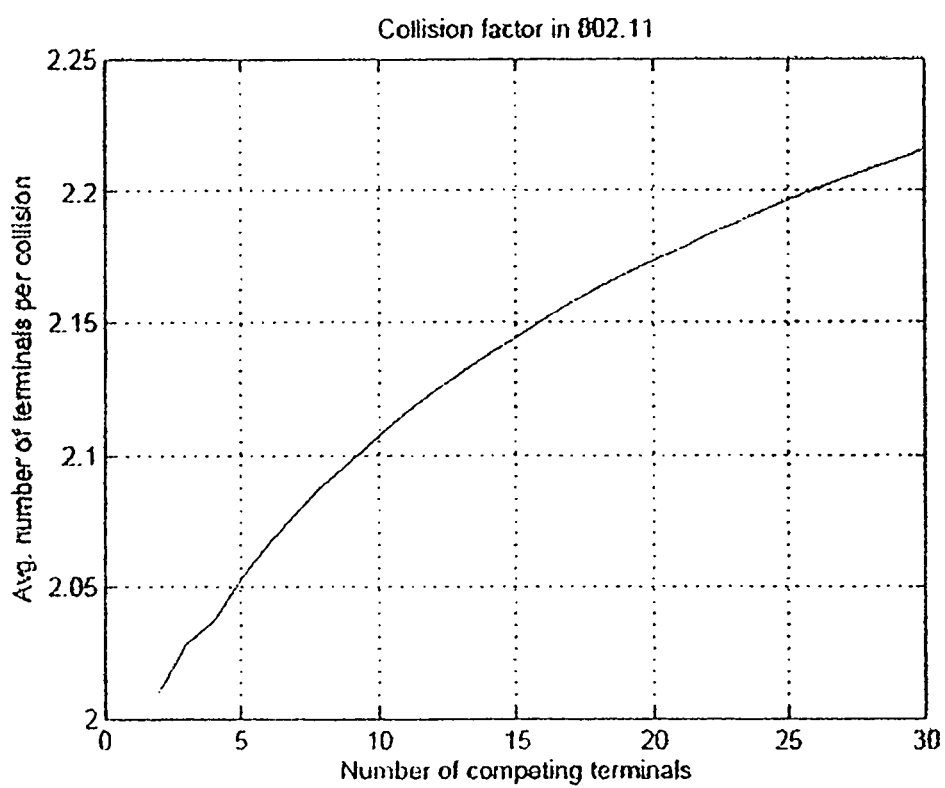
FIG. 3 is an illustrative graph of the average number of network terminals involved in a collision in a standard IEEE 802.11 DCF network when all the terminals are not deviating from the 802.11 protocol.

For example, FIG. 3 shows the average number of terminals involved in a collision in a standard IEEE 802.11 DCF network with $CW_{min}=32$ and $CW_{max}=1024$ when all the terminals are well behaved. The estimate of the collision probability is given by the following equation:

$$\tilde{p}_c = \frac{C\Gamma}{T' + C\Gamma},\qquad\text{(Eq. 6)}$$

where C is the number of collisions, T' is the number of successful transmissions observed by the terminal in the network, and $\Gamma$ is the collision factor. Note that T'+C$\Gamma$ is the average number of transmission attempts in the network, and C$\Gamma$ is, on average, how many of the transmissions resulted in collisions. As before, the measuring/observing terminal may increase or decrease the observation interval T'.

Figure 4:
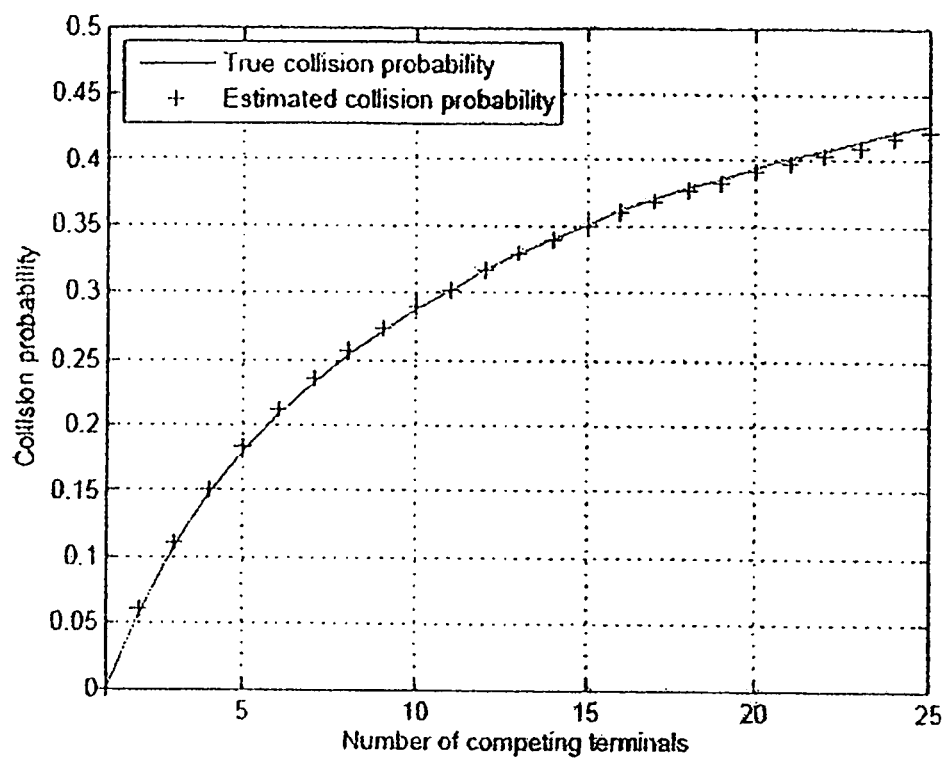
FIG. 4 is an illustrative graph of an estimated collision probability determined using the collision factor for fifteen competing terminals.

The estimate $\tilde{p}_c$ includes $\Gamma$, which corresponds to the number of competing terminals N. While N can be estimated with various techniques known to those skilled in the art, in an IEEE 802.11 DCF network with N≤25 (i.e., terminals that are simultaneously transmitting at any given point in time, not the total number of terminals in the network), it is possible to select a fixed $\Gamma$=2.14, which corresponds to N=15, such that $(p_c-\tilde{p}_c)<0.001$, and $(\tilde{p}_c-p_c)<0.004$ for any given N, as shown in FIG. 4. The small error in the estimation of the collision probability has virtually no effect on the false alarm probability of the detectors, and its simplicity comes at the cost of reducing the probability of detection, although only for misbehavior cases that are extremely close to the legitimate operation of the protocol.

It is expected that the true collision probability $p_c$ varies slowly with respect to the time scale of the transmissions by any terminal in the network. The noise in the estimates $\tilde{p}_c$ and $\hat{p}_c$ may overshoot $p_c$ so that a legitimate terminal may appear as misbehaving. This is of little concern when there is a misbehaving terminal in the network because the difference in collision probability is larger than the noise. However, the noise affects the false alarm probability. Because the cost of a false alarm is very high, the collected data is filtered to reduce the noise by using a robust locally weighted polynomial regression model with a smoothing parameter of five.

Let $\tilde{p}_c^{(1)}, \ldots, \tilde{p}_c^{(n)}$ be the sequence of collision probabilities estimated using Eq. 6 and let the collision probabilities then be filtered as described above. The cdf of the number of idle slots between successful transmissions for a legitimate saturating terminal can be calculated as the average of the cdfs for each of the observed $\tilde{p}_c^{(i)}$, as shown by the following equation:

$$\hat{F}_0 = \frac{1}{n}\sum_{i=1}^{n} F_0(\tilde{p}_c^{(i)}),\qquad\text{(Eq. 7)}$$

where $F_0(\tilde{p}_c^{(i)})$ is the cdf calculated using Eq. 4 with the collision probability $p_c^{(i)}$.

The Kolmogorov-Smirnov (K-S) test is a widely used goodness-of-fit test for continuous data. It is based on an empirical distribution function (edf), which converges uniformly to the real population cdf (Glivenko-Cantelli Theorem), and is known to those skilled in the art. The K-S test is used to determine whether the distribution $f_1$, from which samples are drawn, differs from a hypothesized distribution $f_0$. The K-S test compares an edf $\hat{F}_1$ obtained from the data samples with the hypothesized cdf $F_0$, and determines whether $F_1=F_0$, $F_1<F_0$, or $F_1>F_0$. A null hypothesis $H_0$ is defined as an event where a node is not misbehaving, and is used in the one-sided test shown below:

$$H_0: F_1 \leq F_0 \text{ (not misbehaving)}\qquad\text{(Eq. 8a)},$$

$$H_1: F_1 > F_0 \text{ (misbehaving)}\qquad\text{(Eq. 8b)}.$$

Let $x_1, \ldots, x_N$ be the observations of the number of idle slots between successful transmissions from a terminal using an unknown strategy $f_1$. Also, let $f_0$ be the known probability distribution of a saturating legitimate terminal as specified in Eq. 4. The edf of the observations is given by the following equation:

$$\hat{F}_1(\chi) = \frac{1}{K}\sum_{i=1}^{K} \prod (\chi_i \leq \chi),\qquad\text{(Eq. 9)}$$

where $\Pi( )$ is the indicator function.

A one-sided K-S test statistic D is defined as the maximum value of the difference between the two cdfs, as shown by the following equation:

$$D \triangleq \max_{-\infty \leq \chi \leq +\infty} \{F_1(\chi) - F_0(\chi)\}\qquad\text{(Eq. 10)}$$

and is calculated as shown in the following equation:

$$\hat{D} = \max_{1 \leq i \leq K} \{\hat{F}_1(\chi_i) - \hat{F}_0(\chi_i)\},\qquad\text{(Eq. 11)}$$

where $F_o$ and $F_1$ are calculated using Eq. 7 and Eq. 9, respectively.

The null hypothesis $H_0$ is rejected at a significance level a if $P(D > \hat{D}) < \alpha$ according to the following equation:

$$P(D>\hat{D})=e^{-2\lambda(\hat{D})^2}\qquad\text{(Eq. 12)},$$

where $\lambda(\hat{D})$ is obtained using the following equation:

$$\lambda(\hat{D}) = \max\left\{\left(\sqrt{K} + 0.12 + 6\frac{0.11}{\sqrt{K}}\right)\hat{D}, 0\right\}.\qquad\text{(Eq. 13)}$$

Using the equations described above, two detection algorithms are derived, which can be used to detect if a terminal is deviating from legitimate operation of a network transmission protocol (i.e., misbehaving) in a wireless network, and are discussed in detail below. The first algorithm is referred to as a batch K-S detection algorithm (i.e., a batch K-S test), and the second algorithm is referred to as a N-truncated sequential K-S detection algorithm (i.e., a sequential K-S test).

In one embodiment, the batch or N-truncated sequential detection algorithm is implemented in software that resides and executes on an observing terminal (i.e., a terminal that observes the other terminals in communication with the wireless network) that is in communication with the wireless network. In another embodiment, the software resides and executes on an access point that is part of the wireless network. In still another embodiment, the software resides and executes on each terminal in communication with the wireless network and each terminal observes any neighboring terminals. In yet another embodiment, the software resides and executes on a digital data processing device (e.g., a computer) in communication with a server and a router. The digital data processing device receives data from the router that is analyzed and used to identify misbehaving terminals. After the misbehaving terminals are identified, the digital data processing device transmits information regarding the misbehaving terminals to the server.

It is readily apparent that software incorporating an embodiment of the present invention can be, for example, part of the Wi-Fi connection software, i.e. it is included in the driver provided by the card manufacturer. However a third party could modify a driver and put in on the web, so the user can voluntarily go and install this misbehavior-enabled driver instead of the one provided by the manufacturer. In the case of a router or access point, the manufacturer could implement an embodiment of the present invention on its own software.

Figure 5:
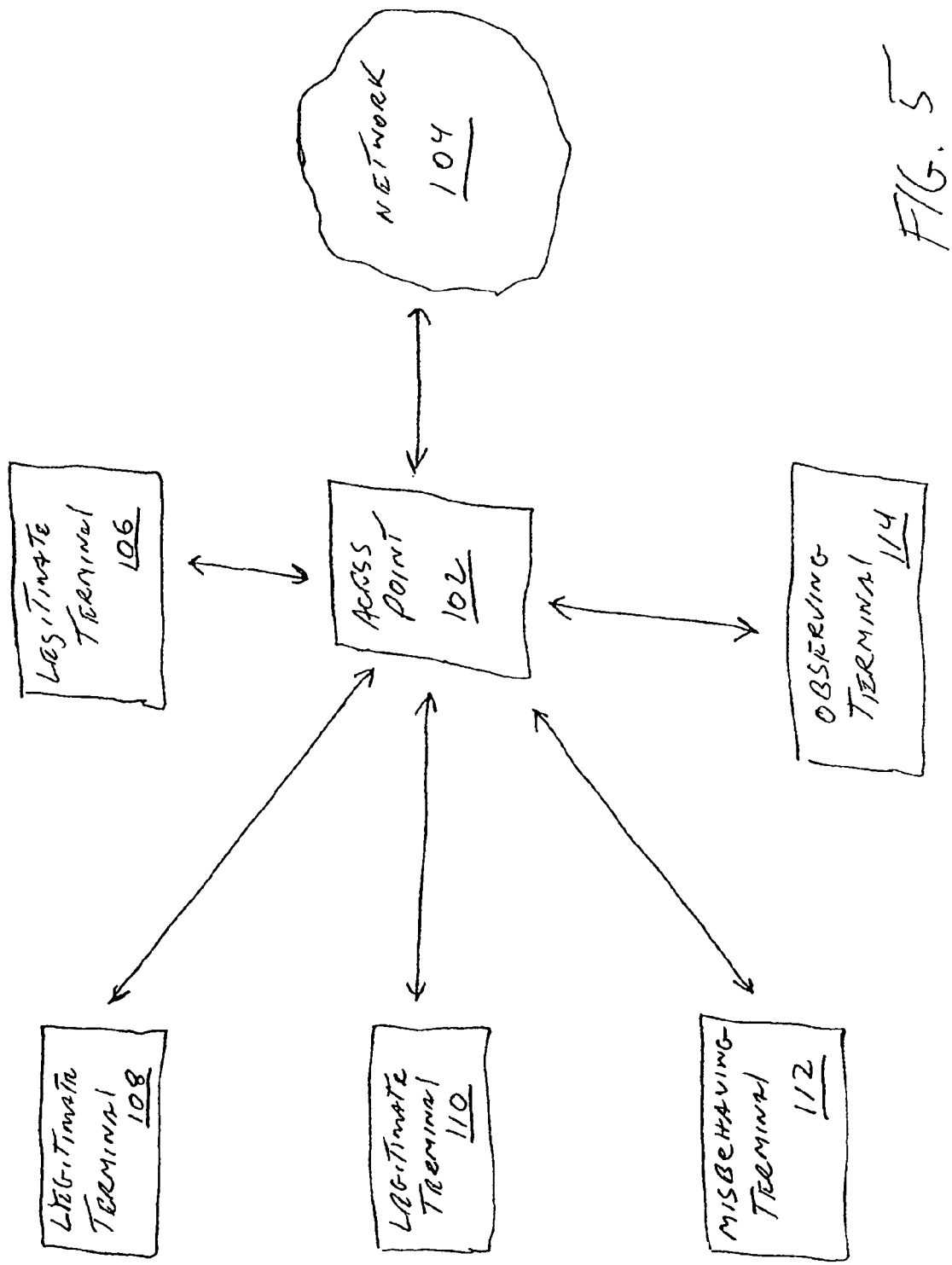
FIG. 5 is an illustrative block diagram of a wireless network employing a system and method to detect a network terminal that deviates from legitimate operation of a network transmission protocol, according to one embodiment of the disclosed subject matter.

Referring to FIG. 5, in one embodiment an illustrative block diagram of a wireless network employing a system and method to detect a network terminal that deviates from legitimate operation of a network transmission protocol (i.e., a misbehaving terminal) is shown. The wireless network includes a wireless access point 102, which provides connectivity to a network 104 (e.g., local area network, wide area network, World Wide Web, or the Internet). The wireless network further includes wireless terminals 106, 108, 110, 112, 114, which wirelessly connect to the access point 102.

In this illustrative embodiment, wireless terminals 106, 108, and 110 are terminals that do not deviate from legitimate operation of the IEEE 802.11 DCF protocol, wireless terminal 112 is a terminal that is observed for the purpose of determining if it deviates from legitimate operation of the IEEE 802.11 DCF protocol (i.e., observed terminal), and wireless terminal 114 is an observing terminal on which the software (i.e., either the batch detection algorithm or the N-truncated sequential detection algorithm) resides and executes, and which observes the other terminals in the wireless network.

Figure 6:
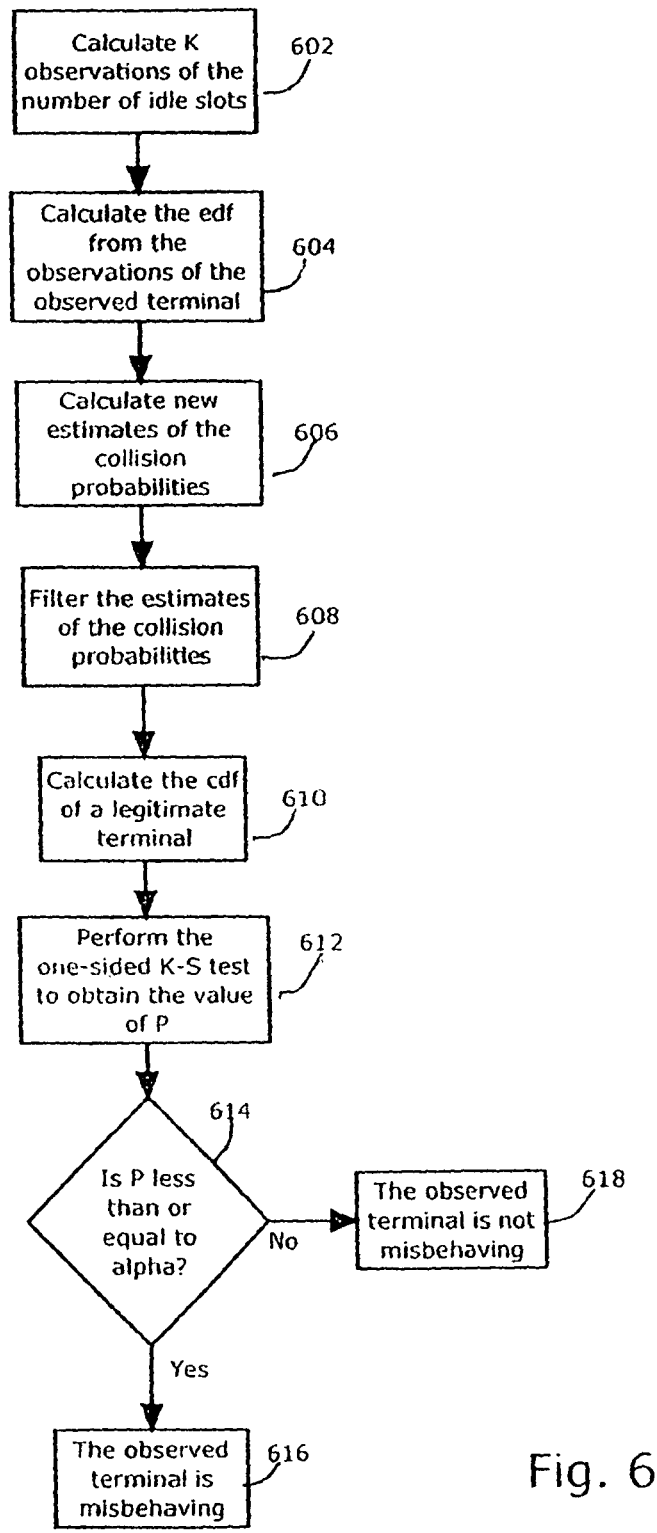
FIG. 6 is an illustrative flow diagram of a batch Kolmogorov-Smirnov (K-S) algorithm for detecting a terminal that deviates from legitimate operation of the IEEE 802.11 DCF protocol, according to one embodiment of the disclosed subject matter.

Referring to FIG. 6, in one embodiment, a flow diagram of a batch K-S detector algorithm for detecting a terminal that deviates from legitimate operation of the IEEE 802.11 DCF protocol is shown. First, the observing terminal 114 calculates K observations of the number of idle slots between successful transmissions of the observed terminal 112 ($x_1, \ldots, x_K$) using Eq. 2 or Eq. 3 (Block 602). The observing terminal 114 also calculates the edf $\hat{F}_1$ from the observations of the observed terminal 112 using Eq. 9 (Block 604). The observing terminal 114 calculates new estimates of the collision probabilities $\tilde{p}_c^{(1)}, \ldots, \tilde{p}_c^{(q)}$ using Eq. 6, every T' successful transmissions in the network (from any terminal) (Block 606). The observing terminal 114 filters the estimates of the collision probabilities as previously described (Block 608). The observing terminal 114 then calculates the cdf of a legitimate terminal $\hat{F}_0$ using Eq. 7 (Block 610).

Implementation of the above-described operations can be done sequentially, with the time relationship being: 602->604. 606->(608)->610. {604,610}->612. In other words, for 604, only 602 is needed. For 610, only 608 is needed, and for 608 only 606 is needed. However, for 612, both 604 and 610 are needed. Operations 602 and 606 can be performed in any order.

It should be noted that filtering per block 608 is regarded as being optional.

After the K-th successful transmission of the observed terminal 112, the observing terminal 114 uses the collected sequence of idle slots between successful transmission $x_1, \ldots, x_K$ and the calculated sequence of estimates of the probability of collision $\tilde{p}_c^{(1)}, \ldots, \tilde{p}_c^{(q)}$ to perform the one-sided K-S test (with a false alarm probability $P_{FA}=\alpha$) for $\hat{F}_1 > \hat{F}_0$ to obtain the significance level P using Eq. 12 (Block 612). The observing terminal 114 then compares P to $\alpha$ (Block 614). If $P \leq \alpha$, then according to the Eqs. 8a and 8b, $H_0$ is rejected and the observed terminal 112 is misbehaving (Block 616). If $P > \alpha$, then according to Eqs. 8a and 8b, $H_0$ is not rejected and the observed terminal 112 is not misbehaving (Block 618).

As previously mentioned, in other embodiments, the software (i.e., the detection algorithm) can be executed by any (or all) terminal(s) in the wireless network. In still another embodiment, the IEEE 802.11 DCF network access point 102 (AP) executes the algorithm and collects samples $x_i$ and observes each terminal 106, 108, 110, 112, 114. Upon the detection of a misbehaving terminal, the access point 102 can take appropriate actions, such as disconnecting the misbehaving terminal from the network for a period of time.

In the case of an ad-hoc network, each terminal may implement the algorithm and observe neighboring terminals. If one terminal discovers an offending terminal, the discovering terminal can deny forwarding privileges to the discovered misbehaving terminal. In still other embodiments, terminals may monitor other neighboring terminals and implement a Nash equilibrium punishing strategy to dissuade other terminals from misbehaving.

The observing terminal in a wireless network makes the above-described calculations in a sequential manner. Therefore, instead of using a fixed number of observations for the K-S test (as described with respect to the batch K-S detection algorithm), in another embodiment, some calculations can be made after a few samples while other calculations are made after many samples. This embodiment is referred to as the N-truncated sequential K-S detection algorithm.

As previously described, the batch K-S detection algorithm involves using a fixed number of samples. However, the significance values of the K-S statistic (see Eq. 12) enable sequential decisions to be made on the null hypothesis. With each new sample, the edf $\hat{F}_1$ is updated and the K-S statistic (Eq. 12) is reevaluated.

In one embodiment, an N-truncated sequential K-S detection algorithm is formed by concatenating N K-S tests, starting with one sample and adding one sample at each subsequent stage up to N stages, where N is the truncation point of the test. The false alarm probability of the N-truncated sequential K-S detection algorithm is fixed to $P_{FA}=\alpha$. Because the N-truncated sequential K-S test is composed of N tests, the false alarm probability of each of the N stages is calculated in order to achieve the overall $P_{FA}$. If P be the false alarm probability of each stage, then the resulting $P_{FA}$ of the N-truncated sequential K-S detection algorithm is calculated using the following equation:

$$P_{FA}^{Seq}\Big|_{N=\alpha} = \beta + (1-\beta)\beta + (1-\beta)^2\beta + \ldots + (1-\beta)^{N-1}\beta = 1 - (1-\beta) \quad \text{(Eq. 14)}.$$

In order to obtain $P_{FA}=\alpha$ in the N-truncated sequential K-S detection algorithm, each individual K-S test uses the threshold $\beta$ where $$\beta = 1 - \sqrt[N]{1-\alpha}. \quad \text{(Eq. 15)}$$

Figure 7A:
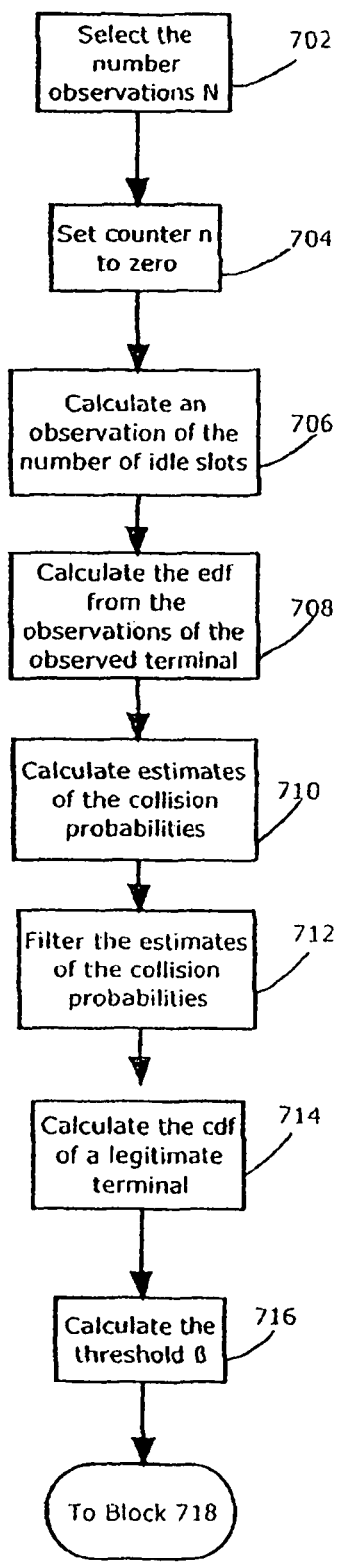
FIGS. 7A and 7B are illustrative flow diagrams of an N-truncated sequential K-S algorithm for detecting a terminal that deviates from legitimate operation of the IEEE 802.11 DCF protocol, according to another embodiment of the disclosed subject matter.
Figure 7B:
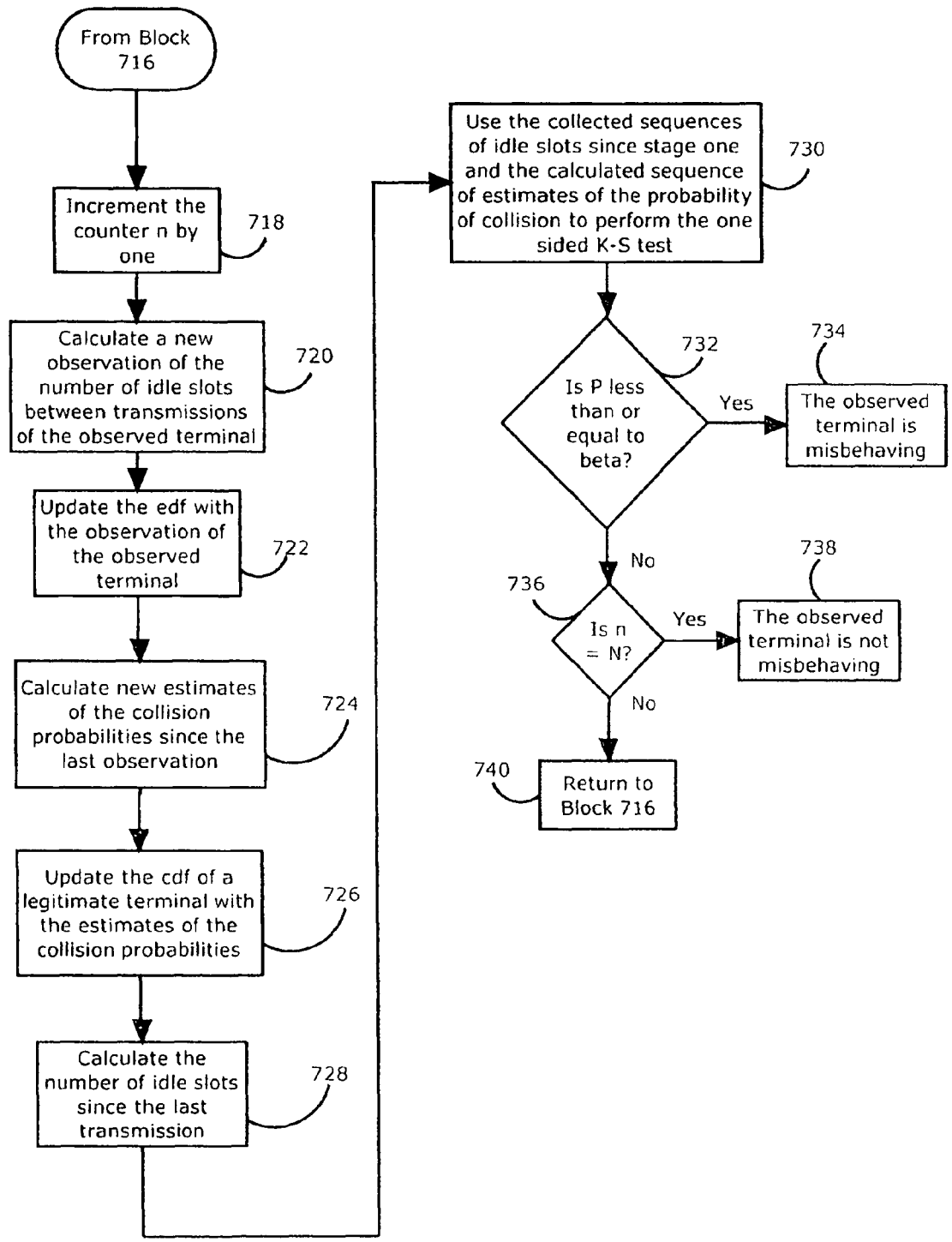

Referring to FIGS. 7A and 7B, in one embodiment, a flow diagram of a N-truncated sequential K-S detector algorithm for detecting a terminal that deviates from legitimate operation of the IEEE 802.11 DCF protocol is shown. First, an observing terminal (e.g., terminal 114 of FIG. 5) selects the maximum number of observations N (Block 702).

Next, the observing terminal 114 sets a counter "n" to zero (Block 704). The observing terminal 114 next calculates an observation of the number of idle slots $x_1, \ldots, x_{n-1}$, between transmissions of the observed terminal (e.g., terminal 112) using Eq. 2 or Eq. 3 (Block 706). The observing terminal 114 then calculates the edf $\hat{F}_1$ with the observation of the observed terminal 112 using Eq. 9 (Block 708). The observing terminal 114 calculates estimates of the collision probabilities $\tilde{p}_c^{(1)}, \ldots, \tilde{p}_c^{(r)}$ using Eq. 6 (Block 710). The observing terminal 114 filters the estimates of the collision probabilities as previously described (Block 712). The observing terminal 114 then calculates the cdf of a legitimate terminal $\hat{F}_0$ with the estimates of the collision probabilities using Eq. 7 (Block 714). The observing terminal 114 then calculates threshold $\beta$ according to Eq. 15 (Block 716). The observing terminal 114 increments the counter n by one (i.e., n=n+1) (Block 718).

The observing terminal 114 next calculates a new observation $x_n$ of the number of idle slots between transmissions of the observed terminal (e.g., terminal 112) using Eq. 2 or Eq. 3 (Block 720). The observing terminal 114 then updates the edf $\hat{F}_1$ with the observation $x_n$ of the observed terminal 112 using Eq. 9 (Block 722).

The observing terminal 114 then calculates new estimates of the collision probabilities $\tilde{p}_c^{(r+1)}, \tilde{p}_c^{(r+2)}, \ldots, \tilde{p}_c^{(q)}$ since the last observation $x_n$–1 (using Eq. 6) every T' successful transmissions in the network (from any terminal), where $\tilde{p}_c^{(r)}$ is the last estimate from stage n–1 (Block 724). The observing terminal 114 then updates the cdf of a legitimate terminal $\hat{F}_0$ with the estimates of the collision probabilities using Eq. 7 (Block 726).

When the next successful transmission of the observed terminal 112 occurs, the observing terminal 114 calculates the number of idle slots $x_n$ since the last transmission (Block 728), and then uses the collected sequences of idle slots since stage one ($x_1, \ldots, x_n$) and the calculated sequence of estimates of the probability of collision $\tilde{p}_c^{(1)}, \ldots, \tilde{p}_c^{(q)}$ to perform the one sided K-S test (with a false alarm probability $P_{FA}=\beta$) for $\hat{F}_1>\hat{F}_0$ to obtain the significance level P using Eq. 12 (Block 730). The observing terminal 114 then compares P to $\beta$ (Block 732). If $P\leq\beta$, then according to the Eqs. 8a and 8b, $H_0$ is rejected and the observed terminal 112 is misbehaving (Block 734). If $P>\beta$, then observing terminal 114 checks to see if n=N (Block 736). If n=N, then $H_0$ is not rejected and the observed terminal 112 is not misbehaving (Block 738). If n≠N, then the observing terminal 114 returns to Block 716 (Block 740). This process continues until a misbehaving terminal is detected or n=N.

In order to avoid having too few estimates of the collision probability (e.g., when n is small), a minimum of ten estimates of the collision probability are obtained before the beginning of the detection steps. These estimates are discarded as new estimates are collected.

The detection methods described above were tested using a simulated IEEE 802.11 DCF network, where a legitimate terminal was assumed to have $CW_{min}=32$ and $CW_{max}=1024$. An ad-hoc based IEEE 802.11 DCF simulator written in MATLAB was used to obtain and verify the cdf of the saturating legitimate terminals (as shown in Eq. 4), and to implement the detectors. Other aspects of the simulations were implemented using a ns-2 network simulator (version 2.28 available as open source).

The simulated IEEE 802.11 DCF network was modified to implement the misbehaving terminal, e.g., changing parameters as described below, and also to implement the misbehavior-detecting terminals, e.g., implementing the Eq. (2) and (3) measurements, and everything else needed to perform the operations depicted in FIGS. 6, 7A and 7B. With these modifications, the network terminals can measure the idle slots between successful transmissions for estimating the collision probabilities. The following parameters used in the simulation were typical for an eleven Mbps 802.11b wireless local area network (WLAN). It was assumed that no packet fragmentation occurred, and that the network terminals were located close to each other to avoid capture or hidden terminal problems. Capture happens when the transmitting power of terminal A is much higher than terminal B. In that case a collision does not occur, because only A is heard. Hidden terminal problems occur when, for example, three terminals are positioned in a line A-B-C. A is only in range of B, C is only in range of B (i.e., A and C cannot detect each other, but both can transmit to B). If A and C transmit at the same time they definitely collide at B, but they cannot detect that there was a collision because they do not know of the other. A is a "hidden terminal" to C and C is a "hidden terminal" to A.

The propagation delay was set to one µs. Data packet size was fixed with a payload of 1024 bytes. The MAC and PHY headers used 272 and 192 bits respectively. The acknowledge signal (ACK) length was set to 112 bits. The receive/transmit (Rx/Tx) turnaround time was set to 20 µs, and the busy detect time was set to 29 µs. The short retry limit and long retry limit was set to 7 and 4 retransmissions respectively. Finally, the slot time was set to 20 µs, the SIFS was set to 10 µs, and the DIFS was set to 50 µs.

Further, misbehaving terminals were assumed to use the binary exponential strategy with $CW_{max}=2^5 CW_{min}$, and $CW_{min}\in\{1, 2, \ldots, 32\}$. The case of $CW_{min}=32$ corresponded to a legitimate terminal. The case of $CW_{min}=16$ corresponded to moderate misbehavior described above. Finally, the case of $CW_{min}=1$ corresponded to a case of extreme misbehavior.

Figure 8:
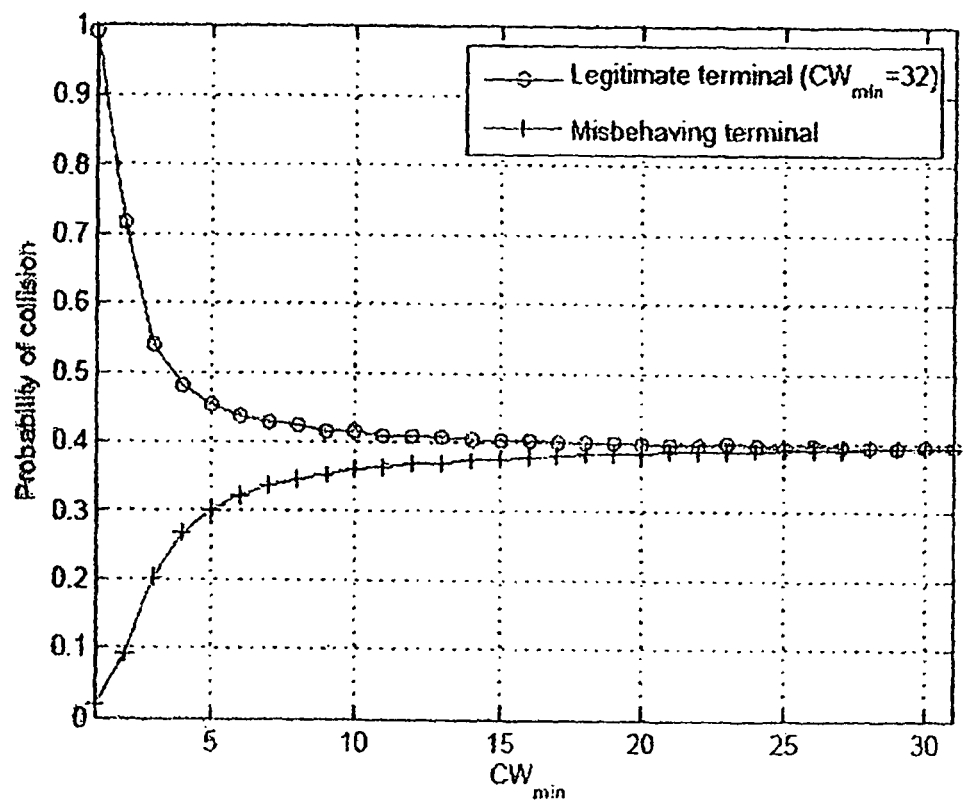
FIG. 8 is an illustrative graph of the observed difference in probability of collision by a misbehaving terminal for a network with twenty terminals.
Figure 9:
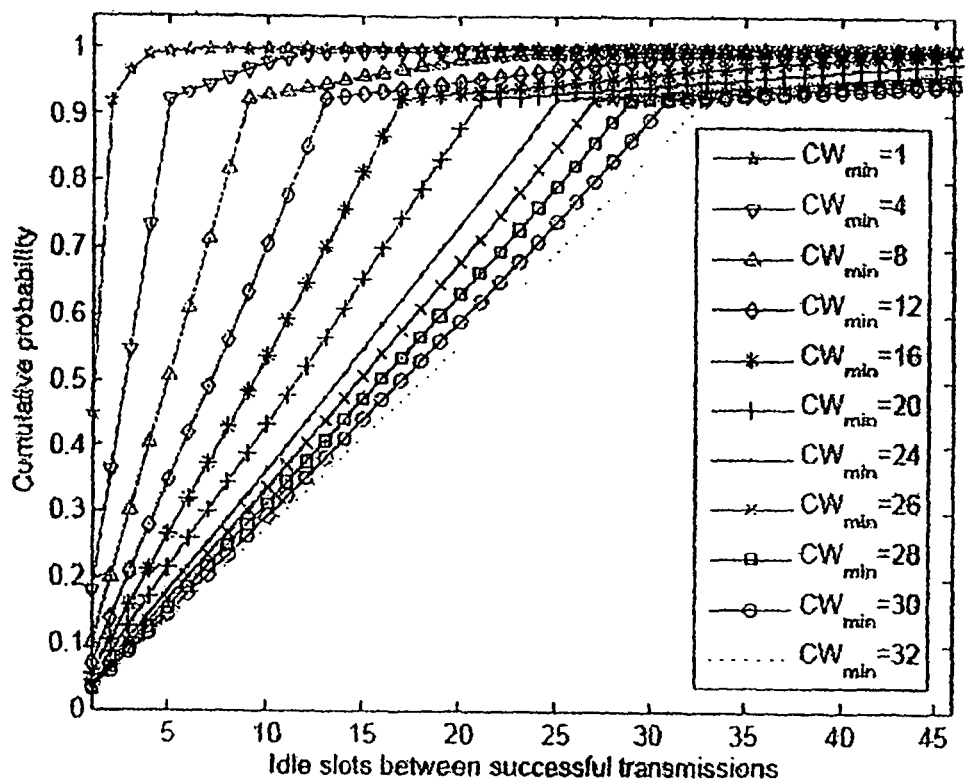
FIG. 9 is an illustrative graph of the cumulative distribution function (cdf) for various misbehavior strategies compared to a strategy of a legitimate terminal.

FIG. 8 is an illustrative graph of the observed difference in probability of collision by a selfish terminal using the above-described misbehavior strategies for a network with twenty terminals. FIG. 9 is an illustrative graph of the cdf for various misbehavior strategies (i.e., $CW_{min}=1$-30) compared to the strategy of a legitimate terminal (i.e., $CW_{min}=32$) when $p_c=0.1$. All these cases represent an overview of the different intensity of misbehaviors, and provide a benchmark for the subjective performance of the described algorithms (i.e., the delay until making a decision). Note that for $CW_{min}>25$, the effect of misbehavior is minimal, so the focus is on fast detection of the strategies with $CW_{min}\leq 25$.

The algorithms described above were compared to optimal detectors (described below) for both the batch and N-truncated sequential detection algorithms. Although the misbehavior strategy $f_1$ is generally not known, the misbehavior strategy $f_1$ was arbitrarily specified for the simulations. The performance of the optimal detectors with a known misbehavior strategy $f_1$ serves as the upper bound for the performance of the above-described batch and N-truncated sequential K-S detection algorithms.

The batch K-S detection algorithm was compared with the optimal Neyman-Pearson detector using the same $P_{FA}=\alpha$. The N-truncated sequential K-S detection algorithm was compared with the optimal Wald's sequential probability ratio test (SPRT) using the same $P_{FA}=\alpha$ and detection probability $P_D$.

Figure 10:
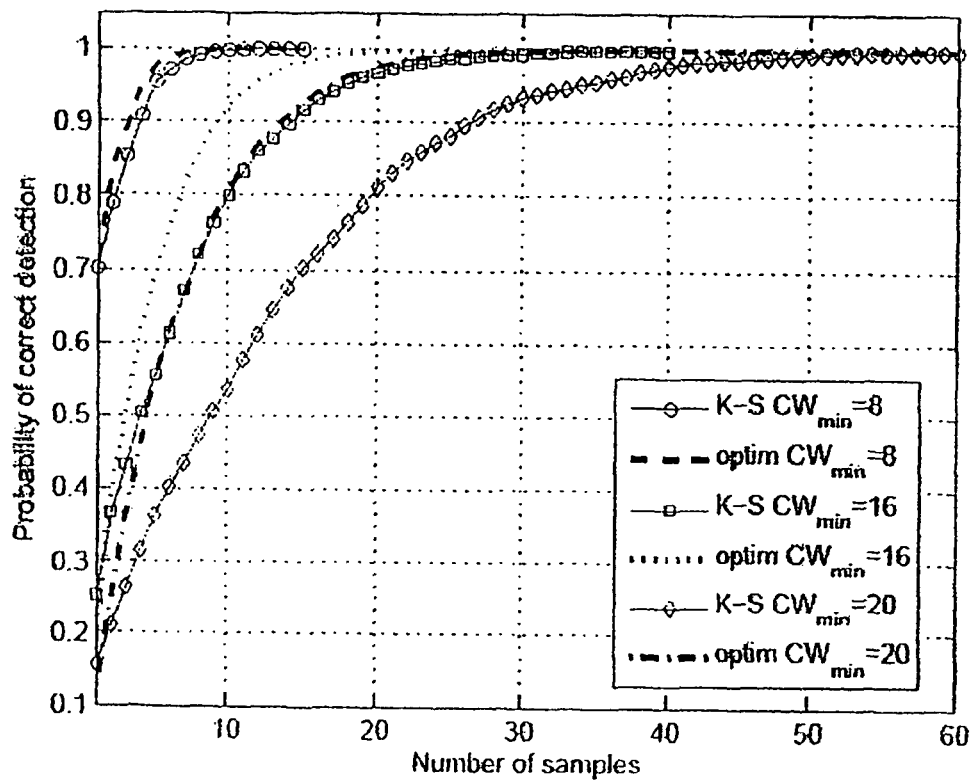
FIG. 10 is an illustrative graph of a comparison of the probability of detection with the batch K-S detector and the optimal Neyman-Pearson detector for a network of ten terminals, according to one embodiment of the disclosed subject matter.

Referring to FIG. 10, an illustrative graph of a comparison of the probability of detection with the batch K-S detection algorithm and the optimal Neyman-Pearson detector for a network of ten terminals is shown. Terminal misbehavior cases $CW_{min}=8$, $CW_{min}=16$ and $CW_{min}=20$, with a $P_{FA}=0.05$ are included. The batch K-S detection algorithm is able to detect the misbehavior terminals quickly, thus requiring less than twice the samples needed by the optimum detector with perfect information.

Figure 11:
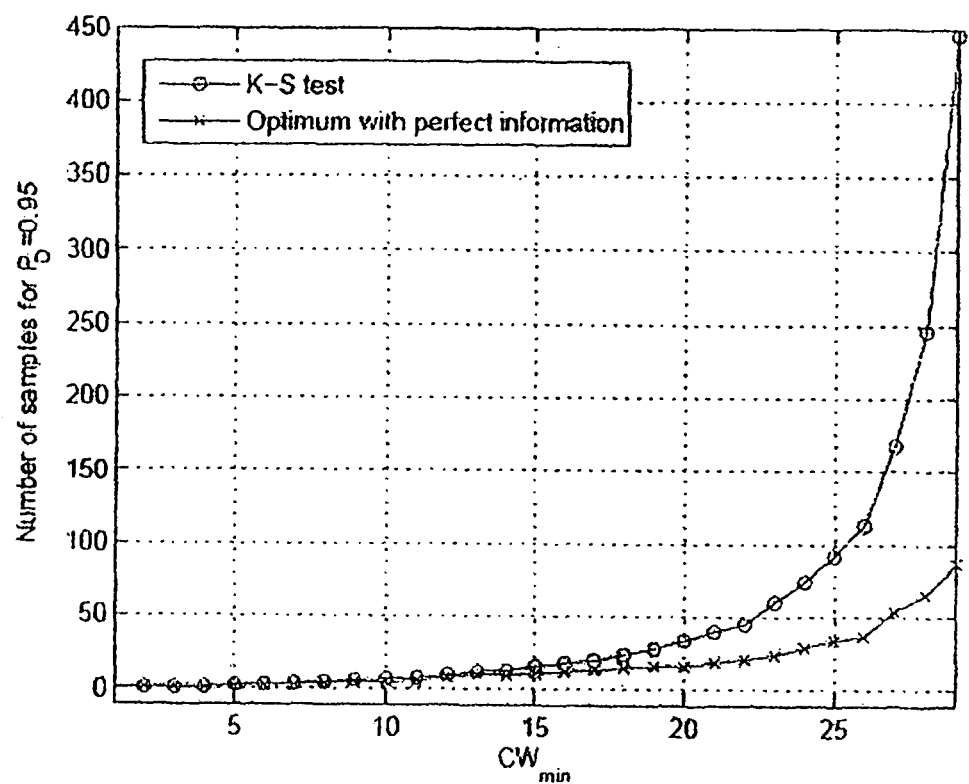
FIG. 11 is an illustrative graph of the number of samples needed to detect a misbehaving terminal for different contention window ($CW_{min}$) strategies.

Referring to FIG. 11, an illustrative graph of the number of samples needed to detect a misbehaving terminal for different $CW_{min}$ strategies with $P_{FA}$=0.05 and PD=0.95 is shown. Note that the performance of the batch K-S detection algorithm starts to degrade only for $CW_{min}$>29, which is very close to the strategy of a legitimate terminal. While the number of samples required grows exponentially as the difference in collision probability is reduced. The main focus is on detection of the class of misbehavior that results in larger gains for the misbehaving terminal. Such a misbehavior would have the most devastating effects on the network because it would deny channel access to the other terminals and would lead to unfair sharing of the channel.

Under good signal-to-noise ratio (SNR) conditions (e.g., in which transmission errors not caused by collisions, such as by low signal strength, are very rare.), a typical IEEE 802.11g network can deliver approximately 24 Mbps to the upper layers, resulting in an approximate throughput of 2230 packets per second, assuming packets of 1400 bytes each. On such a network, and taking into account the throughput of the misbehaving terminal for ten competing terminals, the batch K-S detection algorithm is able to detect the $CW_{min}$=29 strategy in slightly less than 2 seconds, and all the misbehavior strategies $CW_{min}$<29 in less than one second. These times are comparable to the time a terminal needs to connect (and acquire an IP address) to an IEEE 802.11 network.

The batch K-S detection algorithm can be used without modification in a situation where the number of competing terminals is dynamically changing. When the number of competing terminals changes, the observed probability of collision changes accordingly. However, the batch K-S detection algorithm estimates the probability of collision within an observation window. The approximation is valid under the assumption that the probability of collision does not change between two successive transmissions for a given terminal. As discussed above, the speed of the estimation of $p_c$ is fast enough to make at least one estimation of $p_c$ for each successful transmissions of the observed terminal.

Figure 12:
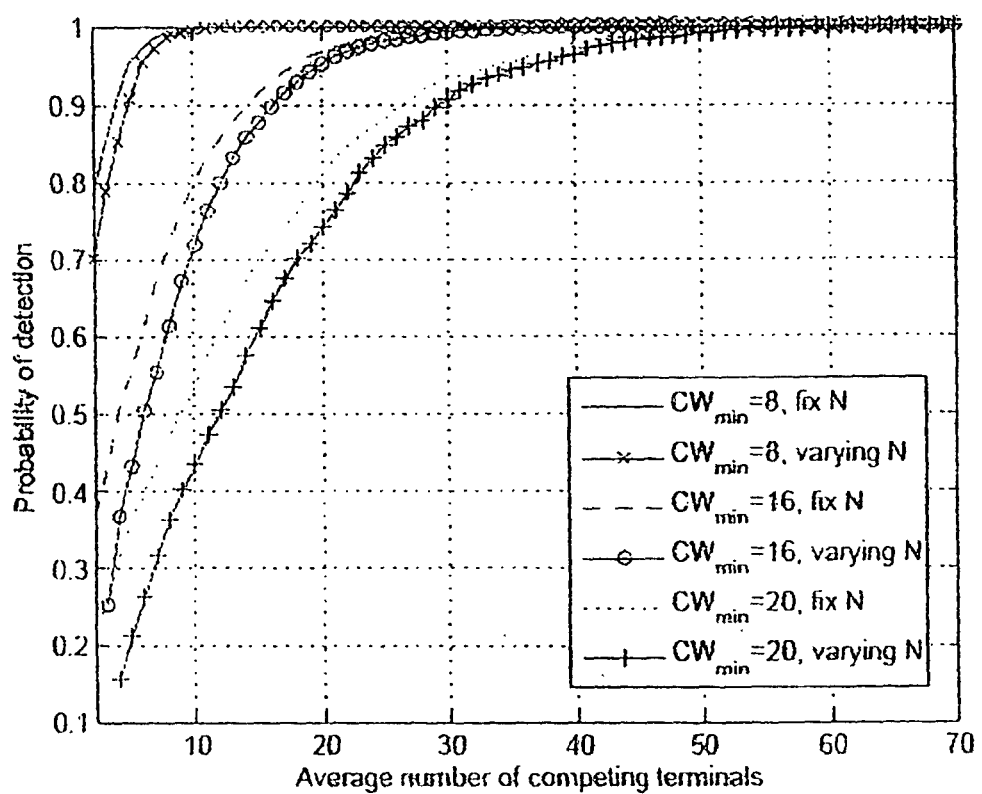
FIG. 12 is an illustrative graph of the performance of the batch K-S detector for an IEEE 802.11 DCF network with one misbehaving terminal using strategies $CW_{min}=8$, $CW_{min}=16$ and $CW_{min}=20$, according to one embodiment of the disclosed subject matter.

Referring to FIG. 12 an illustrative graph of the performance of the batch K-S detection algorithm for an IEEE 802.11 DCF network with one misbehaving terminal using strategies $CW_{min}$=8, $CW_{min}$=16 and $CW_{min}$=20 is shown. This graph includes the case when the number of competing terminals is fixed, and when all the terminals (except the one misbehaving) connect to and disconnect from the network with an exponential distribution parameter of one second. Note that under such a high rate of change of the number of competing terminals with respect to a typical IEEE 802.11 DCF network, the performance of the batch K-S detection algorithm is very close to the case of a fixed number of terminals for $P_D$>0.95.

Next, the N-truncated sequential K-S detection algorithm was compared to an optimal SPRT with identical $P_{FA}$ and $P_D$. While the N-truncated sequential K-S detection algorithm can only fix $P_{FA}$, as the number of samples approaches infinity, the edf approaches the population hypothetical cdf, so the power of the K-S test can be increased with the number of samples with the consequent delay cost. However, it is not possible to specify an arbitrary $P_D$ for the test. This is a consequence of the nonparametric nature of the K-S test.

Figure 13:
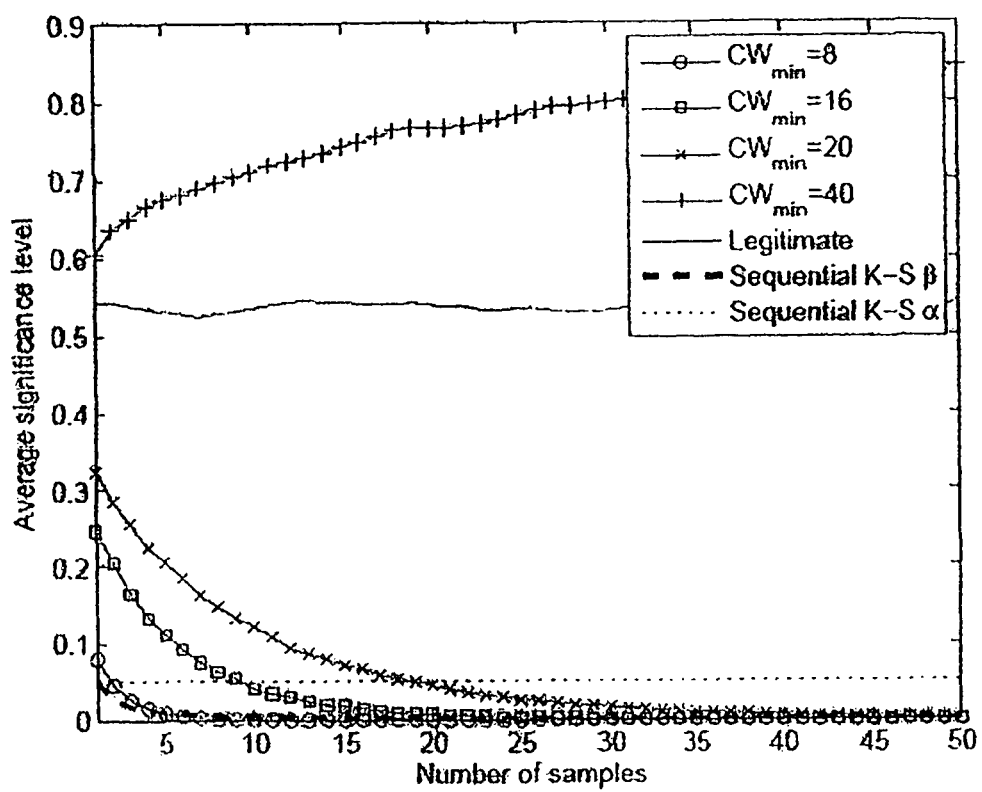
FIG. 13 is an illustrative graph of a significance level of the N-truncated sequential K-S test for misbehavior patterns $CW_{min}=8$ and $CW_{min}=16$, legitimate strategy $CW_{min}=32$, and legitimate strategy $CW_{min}=40$, according to one embodiment of the disclosed subject matter.

Referring to FIG. 13, an illustrative graph of the significance level of the N-truncated sequential K-S detection algorithm for the misbehavior patterns $CW_{min}$=8 and $CW_{min}$=16, legitimate strategy $CW_{min}$=32 and legitimate strategy $CW_{min}$=40 is shown. Note that the significance level converges to 0 when $F_1(\chi)$>$F_0(\chi)$ and converges to 1 when $F_1(\chi)$<$F_0(\chi)$. Also, note that the threshold β of each stage is much lower than α, so it requires more samples for detection than a batch K-S detection algorithm with the same number of samples. However, the performance of the N-truncated sequential K-S detection algorithm is very close to the batch K-S detection algorithm.

Figure 14:
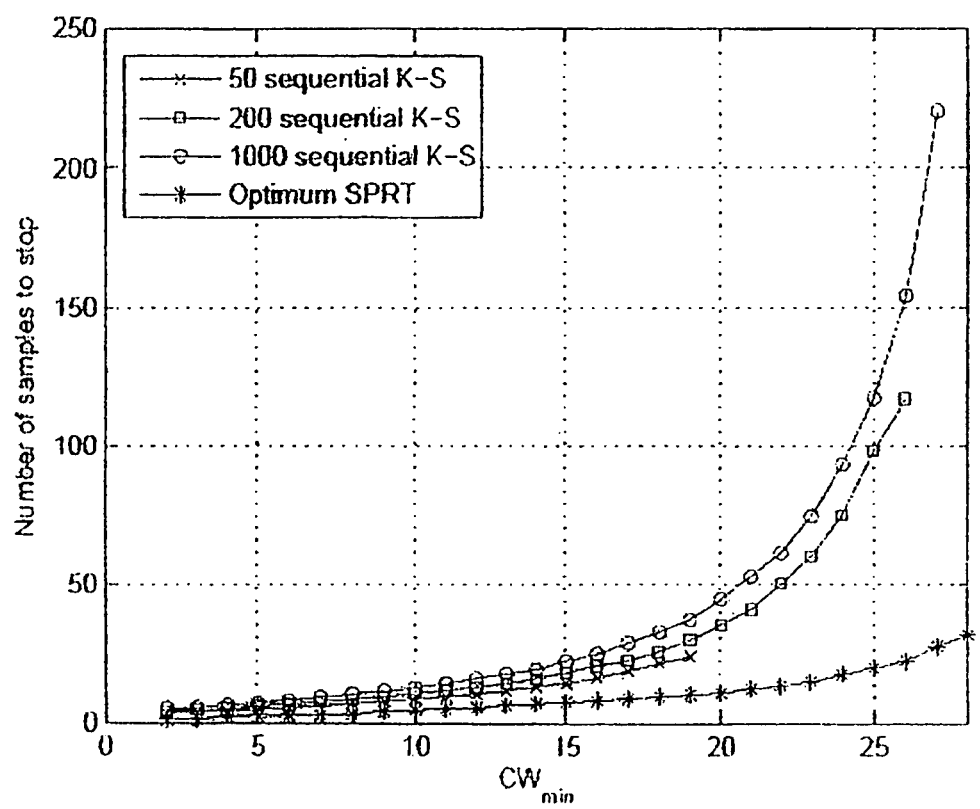
FIG. 14 is an illustrative graph of average stopping times of N-truncated sequential K-S tests for different misbehavior strategies compared to an optimal sequential probability ratio test (SPRT) at a probability density ($P_D$)=0.99, according to one embodiment of the disclosed subject matter.

Referring to FIG. 14, an illustrative graph of the average stopping times of the N-truncated sequential K-S detection algorithm for different misbehavior strategies compared to the optimal SPRT at $P_D$=0.99 is shown. The curves in FIG. 14 stop if the corresponding N-truncated sequential K-S detection algorithm is unable to obtain $P_D$=0.99. The graph in FIG. 14 shows that increasing the truncation parameter N allows the method to detect those types of misbehavior that are less severe and hence more difficult to detect, but at the cost of slightly increasing their stopping times. The penalty being so small suggests that high N are preferable.

Figure 15:
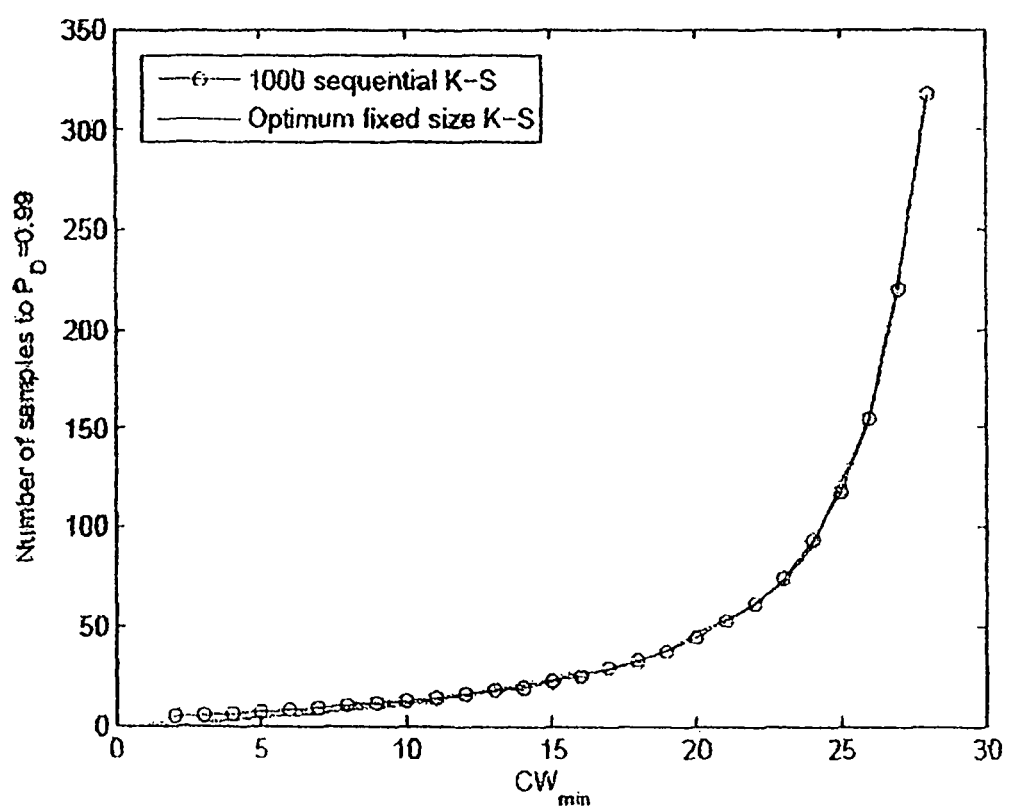
FIG. 15 is an illustrative graph of an average number of samples taken by a 1000-truncated sequential K-S test compared with a batch K-S test, according to one embodiment of the disclosed subject matter.

Referring to FIG. 15, an illustrative graph of the average number of samples taken by the 1000-truncated sequential K-S detection algorithm compared with the best batch K-S detection algorithm (i.e., the fixed-sample-size K-S test that achieves the same $P_D$ with the minimum number of samples) is shown. The graph in FIG. 15 shows that the N-truncated sequential K-S detection algorithm is virtually as good as the best batch K-S detection algorithm. This result shows that the N-truncated sequential K-S detection algorithm does not have a significant performance loss compared to the batch K-S detection algorithm.

Variations, modifications, and other implementations of what is described herein may occur to those of ordinary skill in the art without departing from the spirit and scope of the disclosed subject matter. Further, the various features of the embodiments described herein also can be combined, rearranged, or separated without departing from the spirit and scope of the disclosed subject matter. Accordingly, the invention is not to be defined only by the preceding illustrative description

We claim:

1. A method for detecting an entity in a wireless network that deviates from legitimate operation of a network transmission protocol used on the wireless network, comprising:
    detecting a sequence of observable events related to operation of an entity in the wireless network;
    determining from the detected sequence of observable events for a particular entity in the wireless network what number of idle slots occurred between two consecutive observable events, to provide a first output;
    obtaining a second output corresponding to the number of idle slots between two consecutive observable events for legitimate operation of an entity in the wireless network using the network transmission protocol; and
    comparing a function of the first output with a function of the second output to determine whether the particular entity is deviating from legitimate operation of the network transmission protocol.

2. The method of claim 1, wherein said observable events are successful transmissions from an entity in the wireless network.

3. The method of claim 2, wherein said second output is a probability density function of the number of idle slots between consecutive successful transmissions for legitimate operation of an entity using the network transmission protocol.

4. The method of claim 3, wherein said function of the second output is a cumulative distribution function $F_0$ for a saturating entity.

5. The method of claim 4, wherein said function of the first output is an empirical distribution function $F_1$.

6. The method of claim 5, wherein said comparing is made with a Kolmogorov-Smirnov test which compares the cumulative distribution function $F_0$ with the empirical distribution function $F_1$.

7. The method of claim 6, wherein said comparing determines legitimate operation of the entity when $F_1 \leq F_0$.

8. The method of claim 6, wherein said comparing detects deviation from legitimate operation when $F_1 > F_0$.

9. An apparatus for detecting an entity in a wireless network that deviates from legitimate operation of a network transmission protocol used on the wireless network, comprising:
- means for detecting a sequence of observable events related to operation of an entity in the wireless network;
- means for determining from the detected sequence of observable events for a particular entity in the wireless network what number of idle slots occurred between two consecutive observable events, to provide a first output;
- means for obtaining a second output corresponding to the number of idle slots between two consecutive observable events for legitimate operation of an entity in the wireless network using the network transmission protocol; and
- means for comparing a function of the first output with a function of the second output to determine whether the particular entity is deviating from legitimate operation of the network transmission protocol.

10. The apparatus of claim 9, wherein said observable events are successful transmissions from an entity in the wireless network.

11. The apparatus of claim 10, wherein said second output is a probability density function of the number of idle slots between consecutive successful transmissions for legitimate operation of an entity using the network transmission protocol.

12. The apparatus of claim 11, wherein said function of the second output is a cumulative distribution function $F_0$ for a saturating entity.

13. The apparatus of claim 12, wherein said function of the first output is an empirical distribution function $F_1$.

14. The apparatus of claim 13, wherein said means for comparing applies a Kolmogorov-Smirnov test to compare the cumulative distribution function $F_0$ with the empirical distribution function $F_1$.

15. The apparatus of claim 14, wherein said means for comparing determines legitimate operation of the entity when $F_1 \leq F_0$.

16. The apparatus of claim 14, wherein said means for comparing detects deviation from legitimate operation when $F_1 > F_0$.

17. An apparatus for detecting an entity in a wireless network that deviates from legitimate operation of a network transmission protocol used on the wireless network, comprising:
- a detector coupled to the wireless network and configured to detect a sequence of observable events related to operation of an entity in the wireless network;
- a first calculation module configured for determining from the detected sequence of observable events for a particular entity in the wireless network what number of idle slots occurred between two consecutive observable events, to provide a first output;
- a second calculation module configured for obtaining a second output corresponding to the number of idle slots between two consecutive observable events for legitimate operation of an entity in the wireless network using the network transmission protocol; and
- a comparator configured for comparing a function of the first output with a function of the second output to determine whether or not the particular entity is deviating from legitimate operation of the network transmission protocol.

18. The apparatus of claim 17, wherein said observable events are successful transmissions from an entity in the wireless network.

19. The apparatus of claim 18, wherein said second output is a probability density function of the number of idle slots between consecutive successful transmissions for legitimate operation of an entity using the network transmission protocol.

20. The apparatus of claim 19, wherein said function of the second output is a cumulative distribution function $F_0$ for a saturating entity.

21. The apparatus of claim 20, wherein said function of the first output is an empirical distribution function $F_1$.

22. The apparatus of claim 21, wherein said comparator is configured to perform a Kolmogorov-Smirnov test which compares the cumulative distribution function $F_0$ with the empirical distribution function $F_1$.

23. The apparatus of claim 22, wherein said comparator determines legitimate operation of the entity when $F_1 \leq F_0$.

24. The apparatus of claim 22, wherein said detects deviation from legitimate operation when $F_1 > F_0$.

* * * * *